US008360356B2

(12) United States Patent
Moore

(10) Patent No.: US 8,360,356 B2
(45) Date of Patent: Jan. 29, 2013

(54) FLYING APPARATUS

(75) Inventor: W. Eric Moore, Incline Village, NV (US)

(73) Assignee: W. Eric Moore, Incline Village, NV (US)

( * ) Notice: Subject to any disclaimer, the term of this patent is extended or adjusted under 35 U.S.C. 154(b) by 731 days.

(21) Appl. No.: 12/502,118

(22) Filed: Jul. 13, 2009

(65) Prior Publication Data

US 2010/0012766 A1   Jan. 21, 2010

Related U.S. Application Data

(60) Provisional application No. 61/081,670, filed on Jul. 17, 2008.

(51) Int. Cl.
*B64C 29/00* (2006.01)
*B64C 3/56* (2006.01)

(52) U.S. Cl. ........ 244/4 A; 244/12.5; 244/23 D; 244/46; 244/49

(58) Field of Classification Search ................... 244/4 A, 244/207, 208, 7 C, 12.4, 12.5, 23 D, 46, 49; 60/224, 229, 263
See application file for complete search history.

(56) References Cited

U.S. PATENT DOCUMENTS

| 1,240,669 | A | * | 9/1917 | Capps | 244/4 A |
|---|---|---|---|---|---|
| 2,883,828 | A | * | 4/1959 | Howell | 60/246 |
| 2,941,751 | A | * | 6/1960 | Gagarin | 244/199.1 |
| 3,025,026 | A | * | 3/1962 | Nichols | 244/87 |
| 3,173,629 | A | * | 3/1965 | Uhor | 244/46 |
| 3,669,386 | A | * | 6/1972 | Jacobs et al. | 244/52 |
| 4,205,813 | A | * | 6/1980 | Evans et al. | 244/12.5 |
| 4,379,532 | A | * | 4/1983 | Dmitrowsky | 244/4 A |
| 4,398,687 | A | * | 8/1983 | Nichols et al. | 244/207 |
| 4,463,920 | A | * | 8/1984 | Nichols et al. | 244/207 |
| 4,505,443 | A | * | 3/1985 | Bradfield et al. | 244/12.5 |
| 4,824,053 | A | * | 4/1989 | Sarh | 244/218 |
| 4,938,021 | A | * | 7/1990 | Jones et al. | 60/263 |
| 5,516,060 | A | * | 5/1996 | McDonnell | 244/7 B |
| 6,685,135 | B2 | * | 2/2004 | Geissler | 244/4 A |
| 6,769,648 | B2 | * | 8/2004 | Klima | 244/138 R |
| 7,410,121 | B2 | * | 8/2008 | Dainys | 244/11 |
| 2010/0012766 | A1 | * | 1/2010 | Moore | 244/12.5 |

FOREIGN PATENT DOCUMENTS

JP   2005225480 A   *   8/2005

* cited by examiner

*Primary Examiner* — Joseph W Sanderson
(74) *Attorney, Agent, or Firm* — Kilpatrick Townsend and Stockton LLP

(57) ABSTRACT

A flying apparatus having a thrust directing wing is disclosed. The flying apparatus can include a wing that receives a thrust flow from a thrust flow generator, and selectively redirect the flow in at least one of a plurality of directions. The wing can redirect the thrust flow so as to generate vertical thrust, forward thrust, and combinations thereof. The thrust flow generator can include a gas turbine engine, which can include two rotating shafts and a common burner, with each shaft coupling a compressor with a turbine.

15 Claims, 23 Drawing Sheets

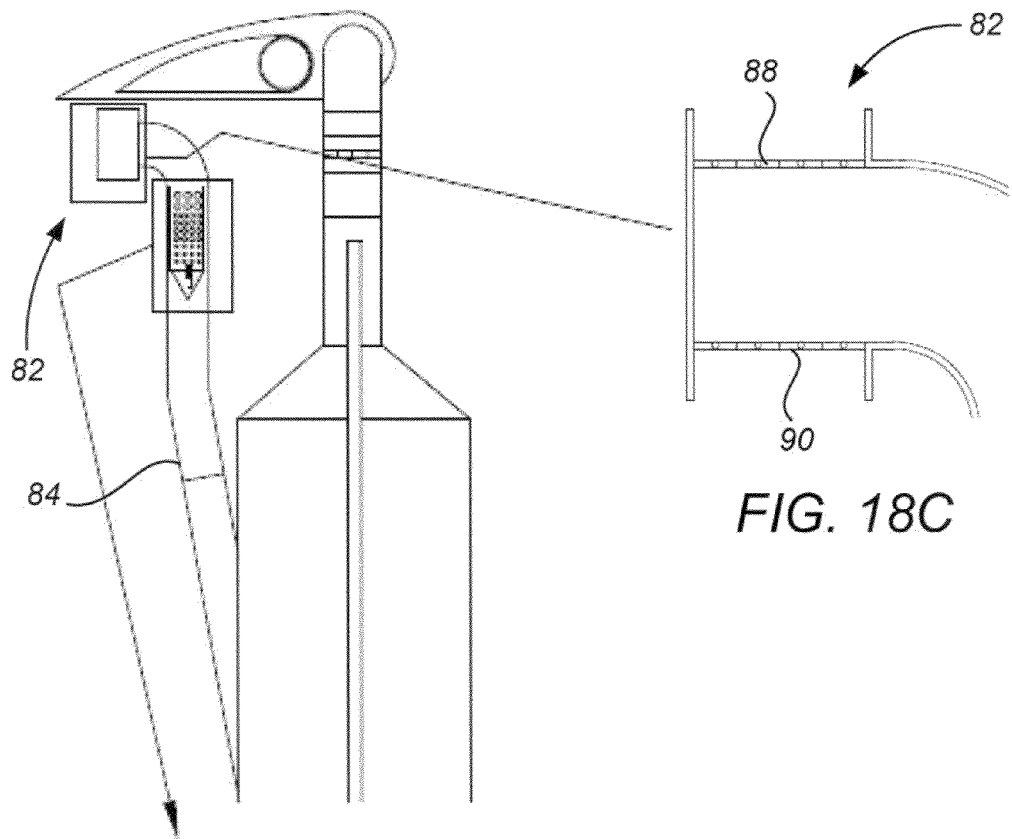
*FIG. 18C*
*FIG. 18A*
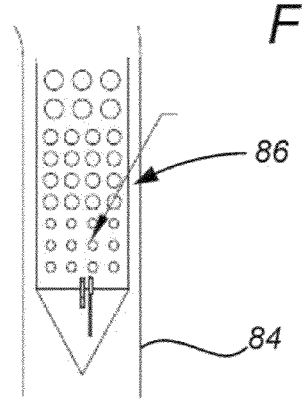
*FIG. 18B*

FLYING APPARATUS

CROSS-REFERENCE TO RELATED APPLICATION

The present invention claims the benefit of priority under 35 U.S.C. §119(e) of U.S. Provisional Application No. 61/081,670, filed Jul. 17, 2008, the entire content of which is incorporated herein by reference.

BACKGROUND

The present disclosure relates generally to the field of aircraft and other flying devices and systems, and more particularly, to an improved vertical takeoff and landing flying apparatus, optionally for use by an individual operator.

Powered flight is a ubiquitous part of modern life. The development of air travel has enabled millions to conveniently travel great distances in a timely and affordable manner. Various types of aircraft, from small private planes to large commercial aircraft, provide an extensive range of choice to the modern day air traveler. Where space for takeoff and landing is constrained, helicopters can be used.

While there are a wide range of air travel choices available today, existing options suffer from significant disadvantages for individuals traveling by air, particularly in terms of their convenience and affordability. Traditional fixed wing aircraft are widely used to great effect, but commercial air travel generally requires getting to the airport sufficiently prior to the departure of the flight. Recently, enhanced security measures at airports established to combat possible terrorism has unfortunately resulted in increased inconvenience for air travelers. Existing private or individual air travel options suffer from a variety of limitations. For example, while personal jet packs provide vertical takeoff and landing capability for demonstrations, air shows, sporting events and the like, their relatively short maximum flight times (typically less than 1 minute) and range limit their use. Accordingly, there may be a need for an improved flying apparatus with vertical takeoff and landing capability that can be used by an individual person.

BRIEF SUMMARY

The present disclosure provides improved short or vertical takeoff and landing flying apparatus. In many embodiments, a flying apparatus incorporates a thrust directing wing for selective redirection of a thrust flow generated by a thrust flow generator. In many embodiments, the thrust flow generator includes a gas turbine engine. In many embodiments, the gas turbine engine includes two rotating shafts with each rotating shaft coupling a compressor with a turbine. In many embodiments, a vertical takeoff and landing flying apparatus configured with a wing provides a forward flight mode during which the wing generates lift, thereby increasing the lift to drag ratio and decreasing the amount of thrust required. A decrease in required thrust level may provide for increased maximum flight time and associated range. A thrust directing wing provides a means for flight control, including the ability to transition between vertical takeoff, forward flight, and vertical landing. A vertical takeoff and landing personal flying apparatus configured with a thrust redirecting wing may provide increased maximum flight time and range as compared to jet packs and the like that rely entirely on engine thrust to maintain lift. A gas turbine engine with two rotating shafts may provide increased damage tolerance, and can be used to generate two separate thrust flows that can be supplied to opposite wing sections.

Thus, in one aspect, a flying apparatus is provided. The flying apparatus comprises a thrust flow generator and a wing coupled with the thrust flow generator. The wing is adapted to receive a thrust flow from the thrust flow generator and selectively redirect the thrust flow in a first direction and in a second direction. When the thrust flow is redirected in the first direction, vertical thrust is predominantly generated. When the thrust flow is redirected in the second direction, forward thrust is predominantly generated.

In many embodiments, a flying apparatus includes one or more additional features. For example, a flying apparatus can comprise a mount configured to couple the flying apparatus with a human operator so as to lift the operator. The wing can comprise a first folding wing section disposed on a first side of the thrust flow generator and a second folding wing section disposed on a second side of the thrust flow generator, the second side being opposite of the first side. Each of the first and second folding wing sections have a folded non-flight position and a deployed flight position. Each of the first and second folding wing sections can be movable between its folded non-flight position and its deployed flight position by way of rotary motion about an axis of rotation. Each of the first and second folding wing sections can be adapted to couple with each other when in their deployed flight positions so as to provide a continuous airfoil. The thrust flow generator can comprise a gas turbine engine. The flying apparatus can comprise a thrust redirecting stabilizing unit to control pitch.

In many embodiments, a flying apparatus includes extendible wing sections. For example, the wing can comprise a left wing portion and a right wing portion, with each wing portion comprising an extendible wing section and an extension mechanism for extending its extendible wing section. The extension mechanism can comprise a motor driven screw. Each of the extendible wing sections can comprise an aerodynamic control surface.

In many embodiments, a flying apparatus includes airflow control devices for selectively redirecting the thrust flow. For example, the wing can comprise an airflow control device for selective redistribution of at least a portion of the thrust flow. Each of the left wing portion and the right wing portion can comprise an airflow device for selective redirection of at least a portion of the thrust flow. An airflow control devices can comprise a rotating nozzle. Each of the extendible wing sections can comprise a leading edge section adapted to accommodate a rotation of a rotating nozzle.

In another aspect, a personal flying apparatus is provided. The personal flying apparatus includes a mount adapted to couple the personal flying apparatus with a human operator, a gas turbine engine coupled with the mount, and a wing coupled with the gas turbine engine. The gas turbine engine includes a first rotating shaft and a second rotating shaft. The first rotating shaft couples a first compressor with a first turbine, and the second rotating shaft couples a second compressor with a second turbine. The wing includes a first span and an oppositely disposed second span. The wing is adapted to receive a first thrust flow from the gas turbine engine, route the first thrust flow along the first span, selectively redirect the first thrust flow in a first direction and in a second direction, receive a second thrust flow from the gas turbine engine, route the second thrust flow along the second span, and selectively redirect the second thrust flow in a third direction and in a fourth direction. When the first thrust flow is redirected in the first direction vertical thrust is predominantly generated. When the first thrust flow is redirected in the second direction forward thrust is predominantly generated. When the second thrust flow is redirected in the third direction vertical thrust is predominantly generated. When the second thrust flow is redirected in the fourth direction forward thrust is predominantly generated.

In many embodiments, a personal flying apparatus includes one or more additional features. For example, the first thrust flow can be received from the first turbine and the second thrust flow can be received from the second turbine. The gas turbine engine can comprise a common burner for adding thermal energy to a combined flow of air that includes output from both the first and second compressors. The personal flying apparatus can comprise a flight configuration and a non-flight configuration, wherein the flight configuration has each of the first and second spans in a deployed flight position, and the non-flight configuration has each of the first and second spans in a folded non-flight position. The first and second folding spans can be adapted to couple with each other when in their deployed flight positions so as to provide a continuous airfoil. Each of the first and second spans can comprise an extendible wing section. The personal flying apparatus can comprise a thrust redirecting stabilizing unit to control pitch.

For a fuller understanding of the nature and advantages of the present invention, reference should be made to the ensuing detailed description and accompanying drawings. Other aspects, objects and advantages of the invention will be apparent from the drawings and the detailed description that follows.

BRIEF DESCRIPTION OF THE DRAWINGS

FIG. 18A is a side-view illustration of a flying apparatus having a thrust redirecting stabilizing unit, in accordance with many embodiments.

FIG. 18B illustrates an optional burner associated with the stabilizing unit of FIG. 18A.

FIG. 18C illustrates upper and lower control louvers of the stabilizing unit of FIG. 18A.

DETAILED DESCRIPTION

The present disclosure provides vertical takeoff and landing flying apparatus. In many embodiments, a personal flying apparatus is provided for use by a single human operator for individual human flight. Alternative embodiments and/or aspects may be employed for unmanned vehicles, for transporting cargo, for Short take-off and/or Landing aircraft, and/or the like. In many embodiments, a flying apparatus includes a thrust directing wing for the selective redirection of a thrust flow received from a thrust flow generator. In many embodiments, a wing provides lift during forward flight. Selective redirection of thrust flow can be used to selectively generate vertical thrust, forward thrust, and combinations thereof, thereby providing the ability to transition between a vertical takeoff and landing mode, a forward flight mode, and combinations thereof.

The present disclosure provides a range of example variations of vertical takeoff and landing flying apparatus. For example, a thrust flow generator can include a gas turbine engine. A wing can include foldable wing sections with each section having a folded non-flight position and a deployed flight position. Foldable wing sections can be movable between a folded non-flight position and a deployed flight position by way of rotary motion. Foldable wing sections can be adapted to couple with each other when in deployed flight positions so as to provide a continuous airfoil. A flying apparatus can include extendible outboard wing sections, each of which can be extended via an extension mechanism. An outboard wing section extension mechanism can include a motor driven screw. A flying apparatus can include one or more control surfaces on each wing span, for example, an aileron control surface. One or more thrust flow control devices can be used to selectively redirect at least a portion of the thrust flow. A thrust flow control device can include a rotating thrust flow nozzle. Extendible outboard wing sections can include a leading edge section adapted to accommodate a rotation of a rotating thrust flow nozzle. A thrust control device can include a valve and/or a louver. A gas turbine engine can include a first rotating shaft that couples a first compressor with a first turbine, and a second rotating shaft that couples a second compressor with a second turbine. A first thrust flow can be received from a first turbine and routed along a first wing span, and a second thrust flow can be received from a second turbine and routed along a second wing span. A gas turbine engine can include dual rotating shafts and a common burner.

Figure 1A:
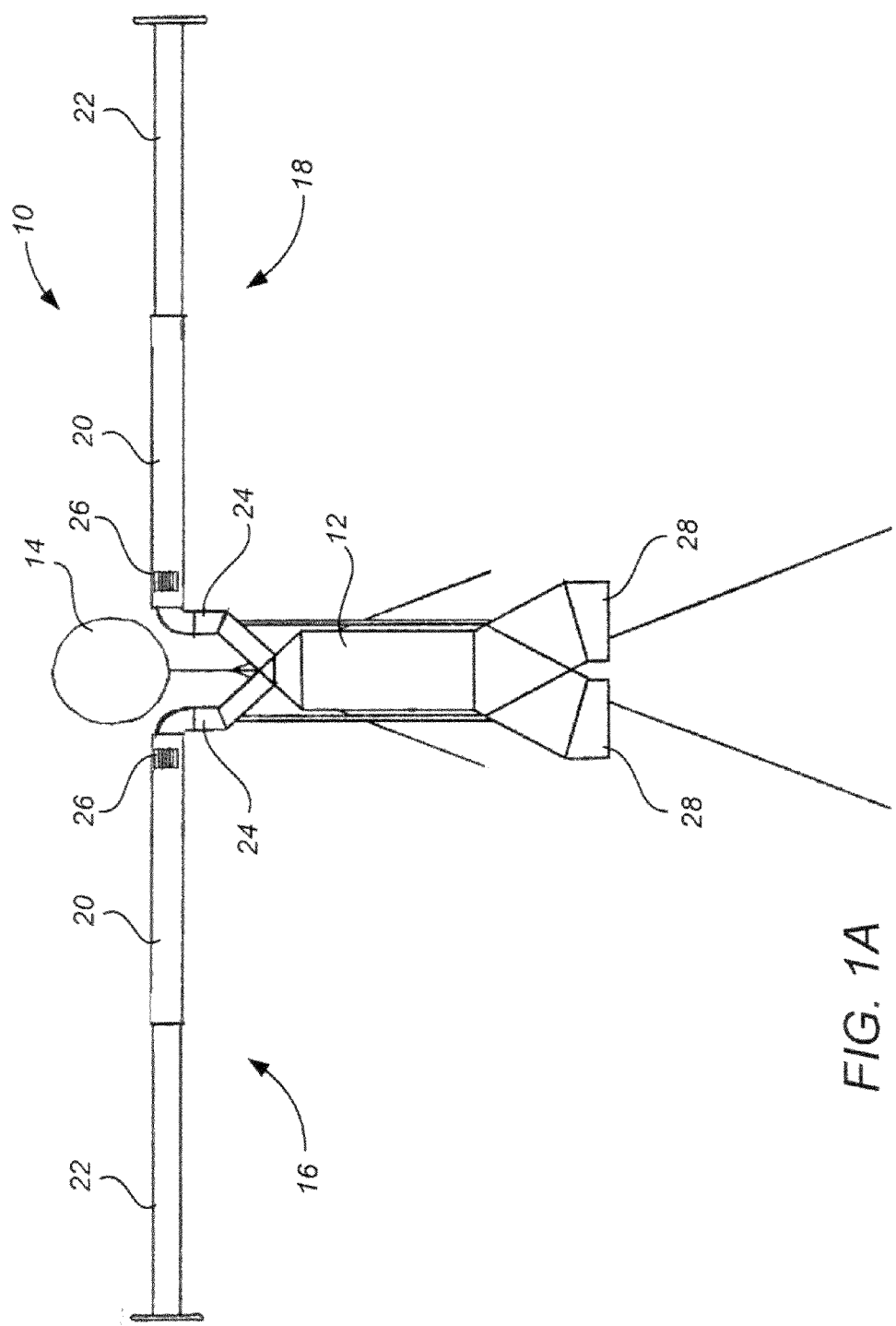
FIG. 1A is a simplified rear-view depiction of a personal flying apparatus, in accordance with many embodiments.

Turning now to the drawing figures, disclosed embodiments will now be described in greater detail. FIG. 1A provides a simplified review-view depiction of a personal flying apparatus 10, in accordance with many embodiments. The flying apparatus includes a thrust flow generator 12, a mount (not shown) for coupling the flying apparatus 10 to a human operator 14, and a left wing section 16 and similarly configured right wing section 18. Each wing section can include an inboard section 20 and an extendible outboard section 22 as shown, or can include a single wing section without an extendible outboard section 22. The thrust flow generator 12 can supply a thrust flow to the wings via the connecting ducts 24. The thrust flows received by the wing sections can be selectively redirected so as to produce vertical thrust, forward thrust, or combinations thereof. During vertical takeoff and landing, the wings can redirect the thrust flow to produce vertical thrust. During forward flight, the wings can redirect the thrust flow so as to produce at least a component of forward thrust as required to support forward flight. Forward thrust can be generated by redirection of at least a portion of the thrust flow to the forward thrust vents 26. The thrust flow generator can include a gas turbine engine that receives airflow via one or more airflow intakes 28.

Figure 1B:
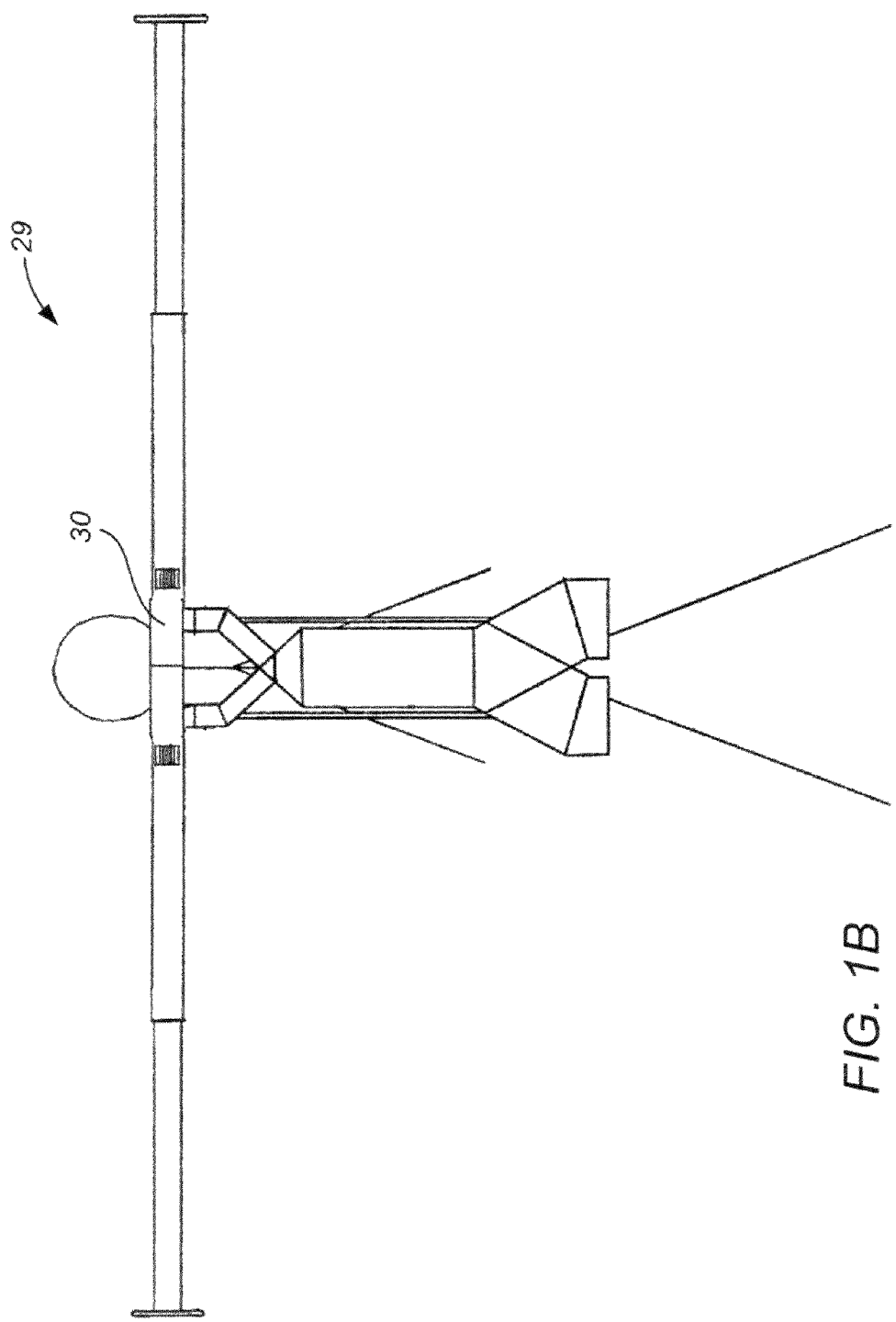
FIG. 1B is a simplified rear-view depiction of a personal flying apparatus with wing sections coupled to provide a continuous airfoil, in accordance with many embodiments.

FIG. 1B provides a simplified rear-view depiction of a personal flying apparatus 29 with wing sections coupled to provide a continuous airfoil 30, in accordance with many embodiments. The continuous airfoil 30 may provide a number of advantages. For example, a continuous airfoil may provide a greater lift to drag ratio as compared to some non-continuous wings. Additionally, the continuous wing 30 of FIG. 1B has significantly reduced interface bending moments between the wing and the rest of the flying apparatus as compared to some non-continuous wings.

Figure 2:
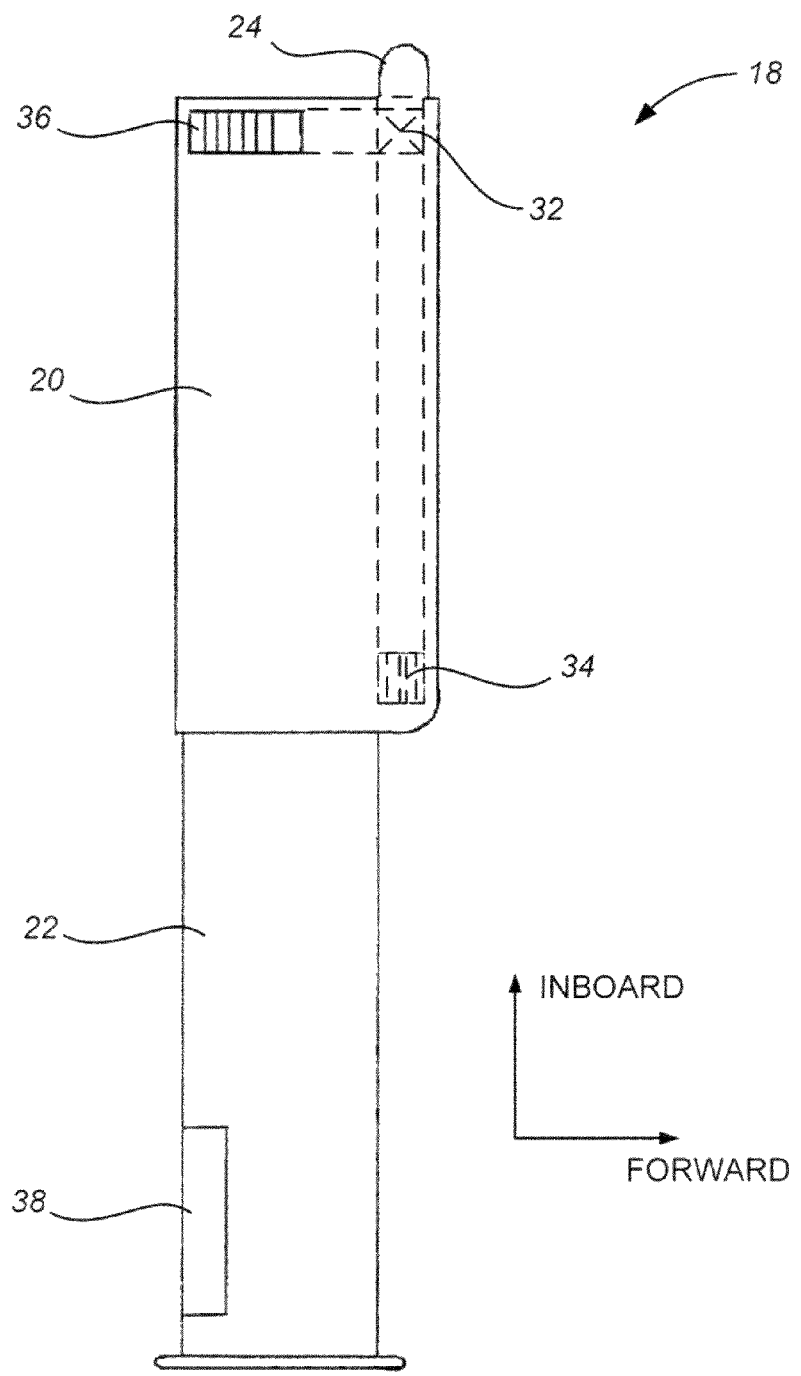
FIG. 2 is a plan view of a right hand wing in a deployed flight position, in accordance with many embodiments.

FIG. 2 shows a plan view of a right hand wing 18 with an inboard wing section 20 and an extended outboard wing section 22, in accordance with many embodiments. The wing 18 receives a thrust flow from the thrust flow generator 12 by way of connecting duct 24. A thrust flow control device 32 can be used to selectively route portions of the thrust flow to a vertical thrust port 34, a forward thrust port 36, or combinations thereof. The vertical thrust port 34 can include one or more directional control devices for varying the direction of thrust generated by the discharge of thrust flow so as to provide further flight control for the flying apparatus. For example, the vertical thrust port 34 can include devices such as adjustable louvers, rotating nozzles, or the like. The forward thrust port 36 provides for the generation of forward thrust via the discharge of thrust flow. The wings of the flying apparatus 10 can include any number of flight control devices, such as the aileron 38 shown at the outboard portion of the extended outboard wing section 22.

Figure 3:
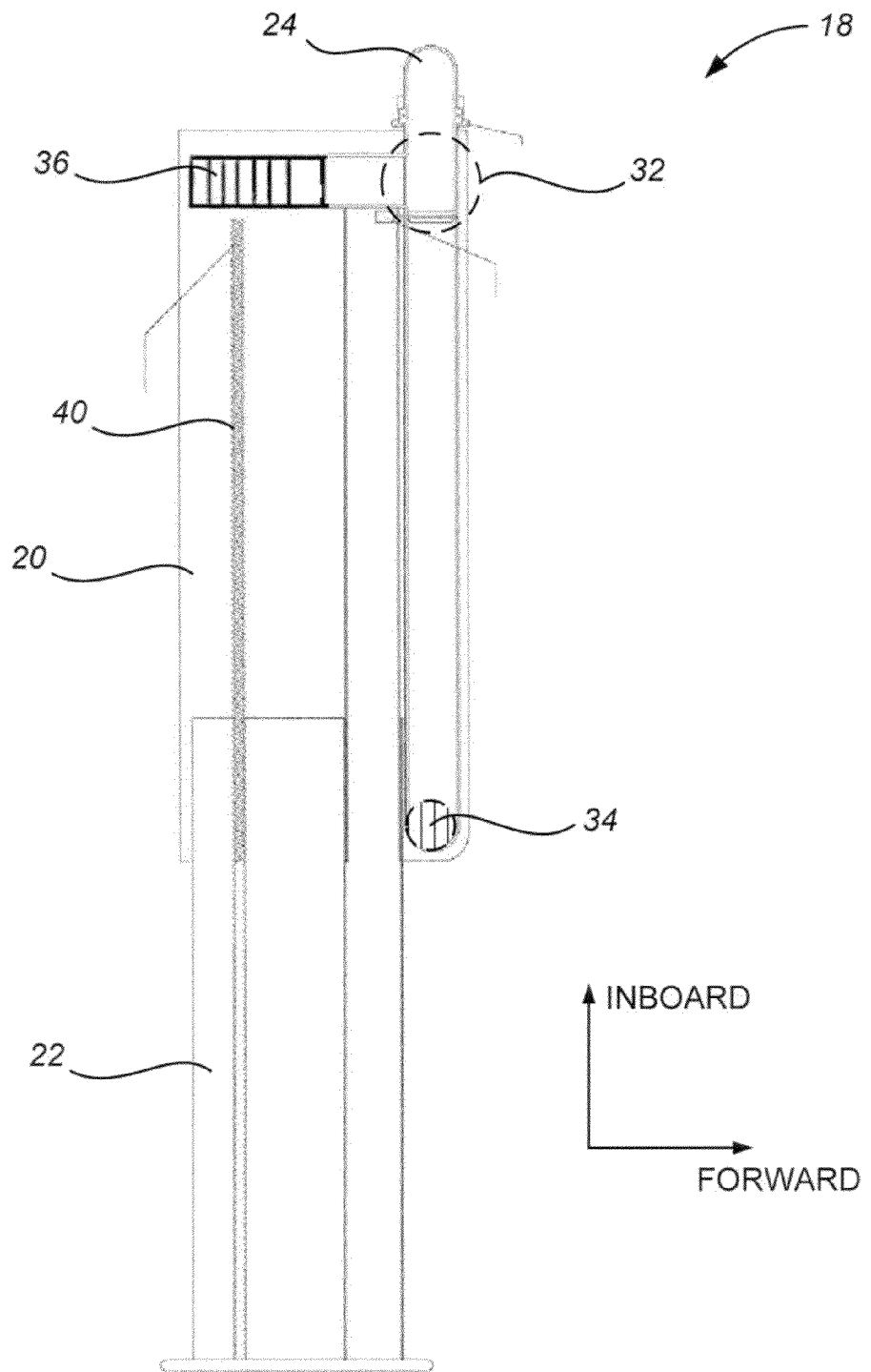
FIG. 3 is a plan view showing internal features of the wing of FIG. 2.

FIG. 3 provides a plan view illustrating internal features of the right hand wing 18 of FIG. 2. The inboard wing section 20 and extended outboard wing section 22 can be adapted to provide for extension and retraction of the outboard wing section 22. Extension and retraction of the outboard wing section 22 can be accomplished with the aid of an extension mechanism, such as a rotating screw 40, which can be used to translate the outboard wing section 22 relative to the inboard wing section 20. The outboard wing section 22 stores within the inboard wing section 20. The rotating screw 40 can be driven by a motor (not shown). The thrust flow control device 32 can selectively place the vertical thrust port 34 and/or the forward thrust port 36 in communication with the connecting duct 24.

Figure 4:
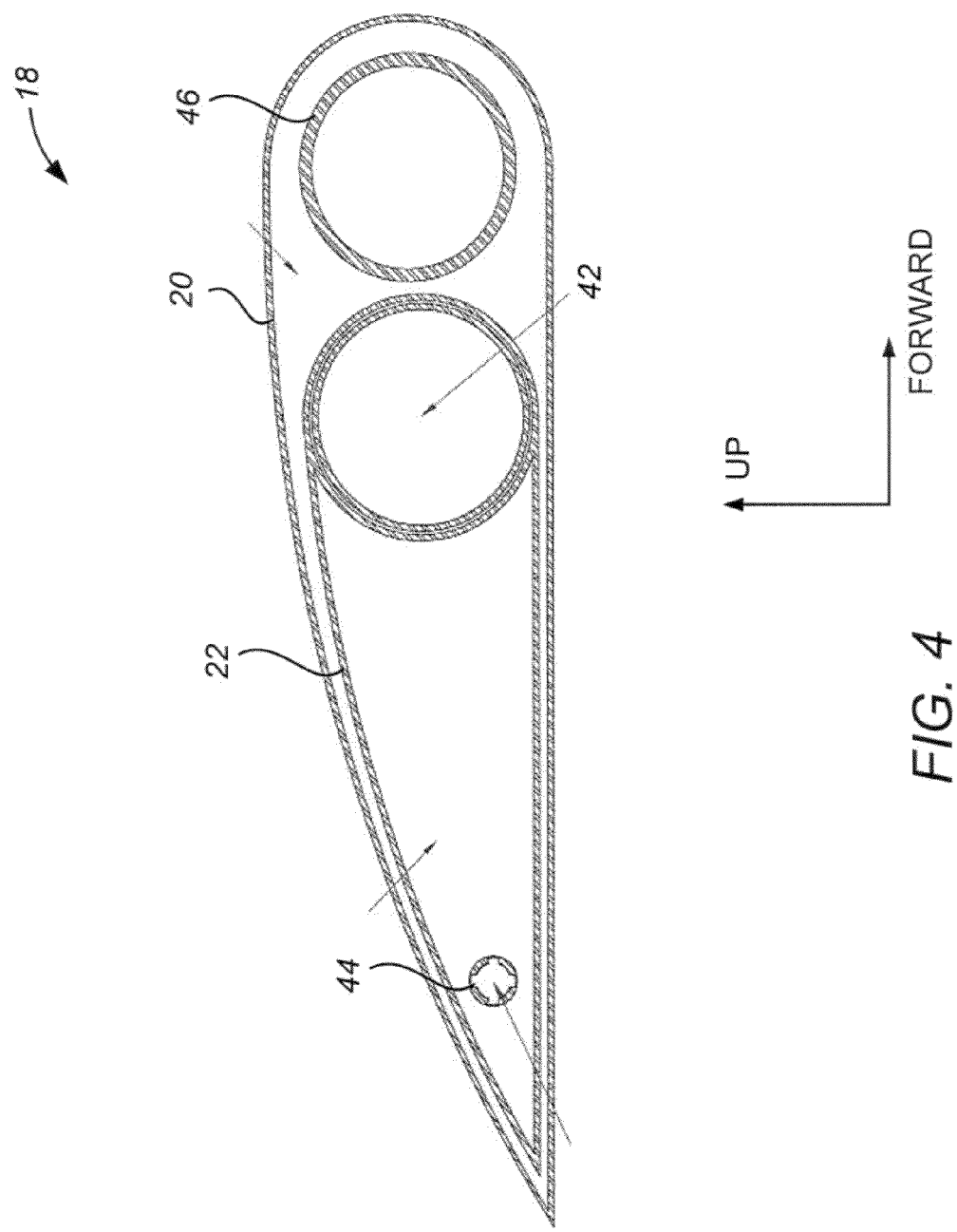
FIG. 4 is a cross-sectional view of a wing, showing the relative spatial relationship between an inboard wing section and associated extendible outboard wing section, in accordance with many embodiments.

FIG. 4 is a cross-sectional view of the wing 18, showing the relative spatial relationship between an inboard wing section 20 and associated extendible outboard wing section 22, in accordance with many embodiments. The extendible outboard wing section 22 can be extended along a guide feature 42, for example, by an extension feature 44. A wide range of features can be used to provide for extension and retraction of the outboard wing section 22. For example, features such as guide rollers, support tracks, and linkage mechanisms, as are well know in the art, can be used to provide for extension and retraction of the outboard wing section 22. The extendible outboard wing section 22 can be located aft of a thrust flow transfer duct 46 used to supply thrust flow to the vertical thrust port 34 shown in FIGS. 2 and 3.

Figure 5:
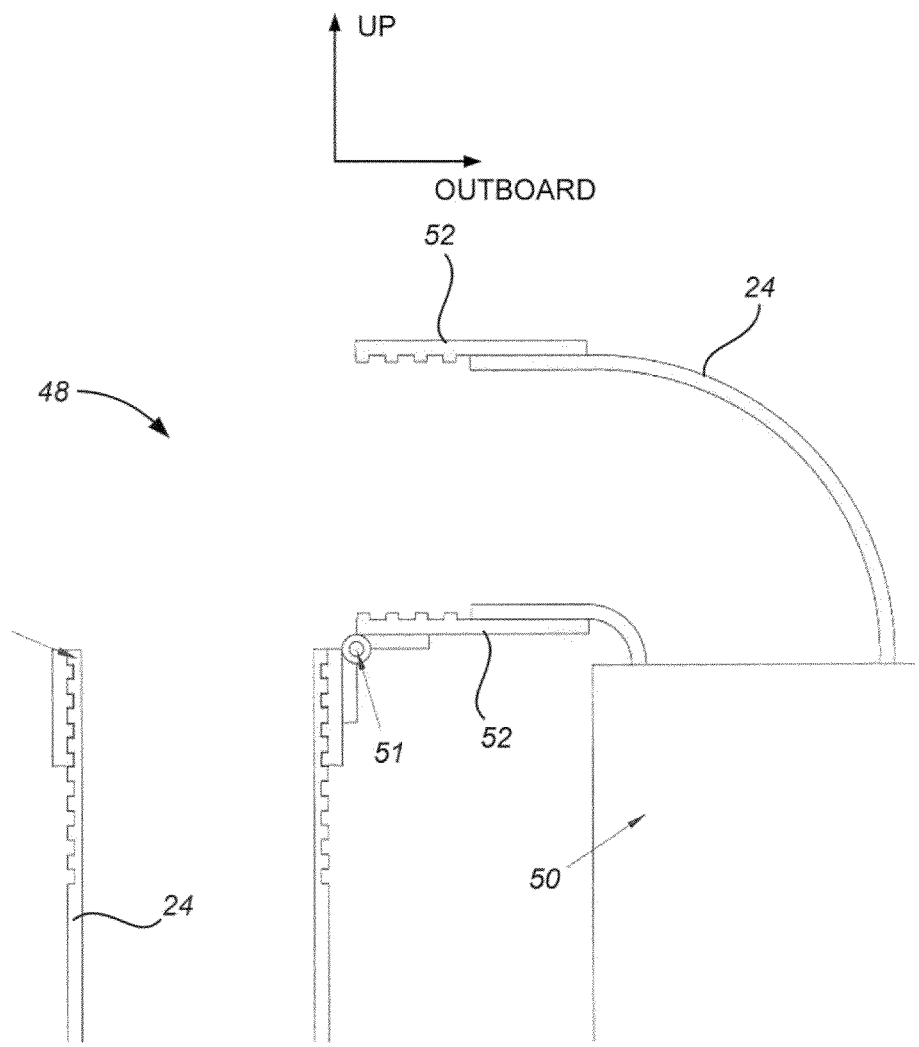
FIG. 5 is a cross-sectional view of a coupling between adjacent portions of a thrust flow connecting duct, and of an associated folding wing section in a folded non-flight position, in accordance with many embodiments.
Figure 6:
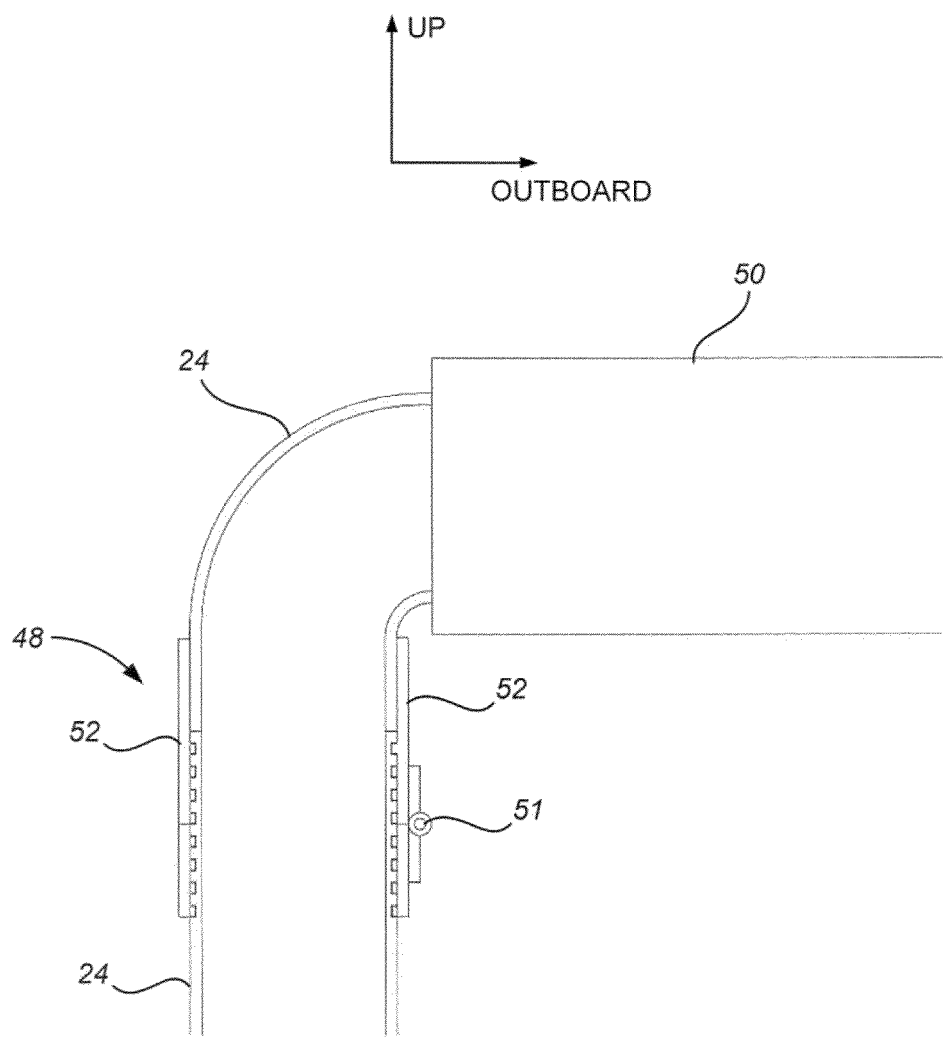
FIG. 6 is a cross-sectional view of the coupling of FIG. 5 when the associated wing section is in a deployed flight position.

FIG. 5 is a cross-sectional view of a coupling 48 between adjacent portions of a thrust flow connecting duct 24, and of an associated folding wing section 50 shown in a folded non-flight position, in accordance with many embodiments. FIG. 6 is a similar view, but shows the folding wing section 50 in a deployed flight position. The coupling 48 includes a hinge line 51, and an outer sleeve 52 used to prevent rotation about the hinge line 51 when the folding wing section 50 is in a deployed flight position. A wide range of designs can be used to provide the ability for the connecting duct 24 to accommodate the motion of the folding wing section 50. These designs can include components designed to selectively react interface forces between the folding wing section 50 and the rest of the flying apparatus 10, or can be designed to substantially isolate the connecting duct 24 from wing interlace forces.

Where the connecting duct 24 is isolated from one or more wing interface forces, appropriate structural members can be provided between the wing and the rest of the flying apparatus to react these interface forces.

Figure 7:
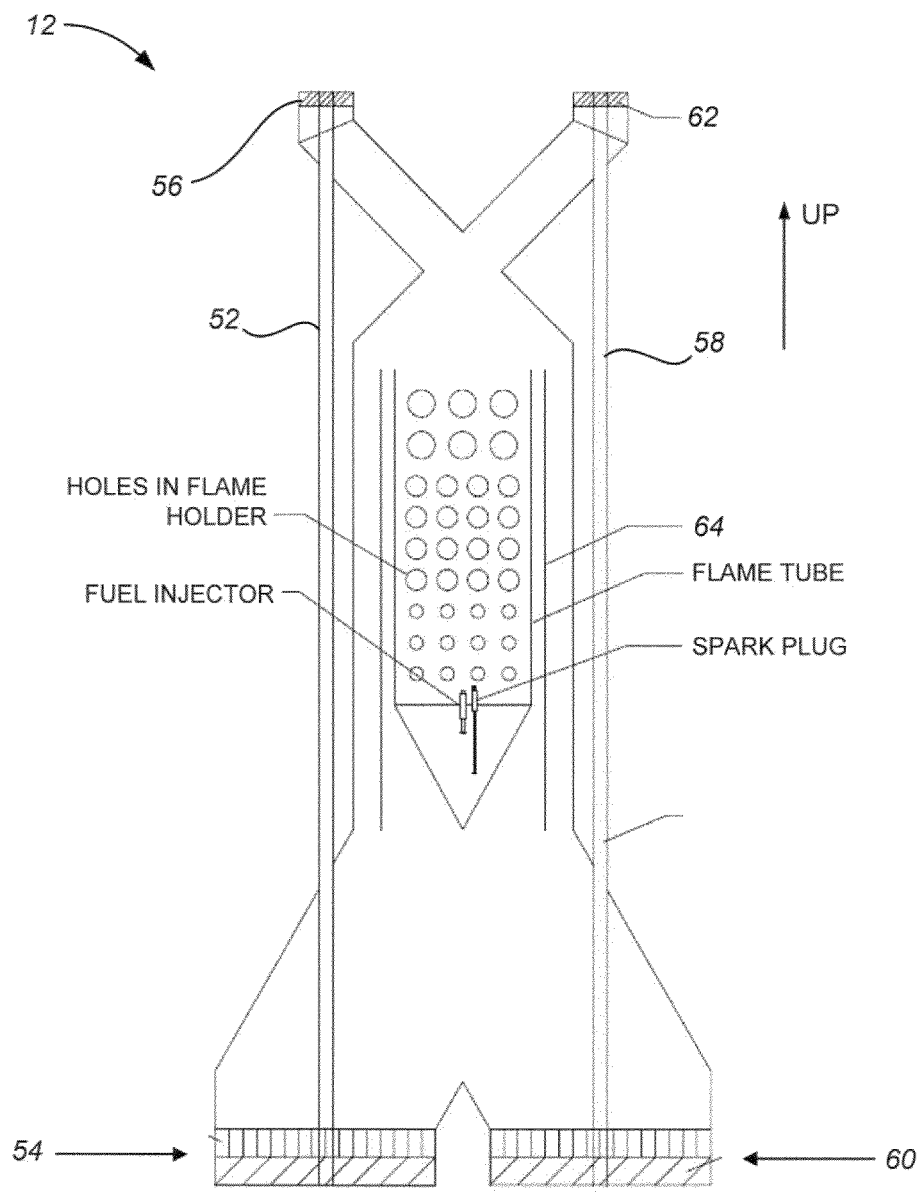
FIG. 7 is a simplified diagram of a thrust flow generator that includes a dual shaft gas turbine engine, in accordance with many embodiments.

FIG. 7 is a simplified diagram of a thrust flow generator 12 that includes a dual shaft gas turbine engine, in accordance with many embodiments. The gas turbine engine shown includes a first rotating shaft 52 that couples a first compressor 54 with a first turbine 56. A second rotating shaft 58 couples a second compressor 60 with a second turbine 62. The first and second compressors can be selected to be any number of types of compressors as are well know in the art, such as an axial flow compressor that includes multiple stages, or a centrifugal compressor (sometimes referred to as a radial compressor) that includes one or more stages. Centrifugal compressors are often used in small gas turbine engines used in auxiliary power units and other smaller aircraft gas turbines, and may be preferable in this application due to reduced efficiency associated with small axial flow compressors associated primarily with tip-clearance losses. The first and second turbines can also be selected to be any number of types of turbines as are well know in the art, such as an axial flow turbine that includes one or more stages, or a radial turbine that includes one or more stages. The gas turbine engine shown includes a central burner 64 for adding thermal energy to the airflow compressed by the first and second compressors.

Figure 8:
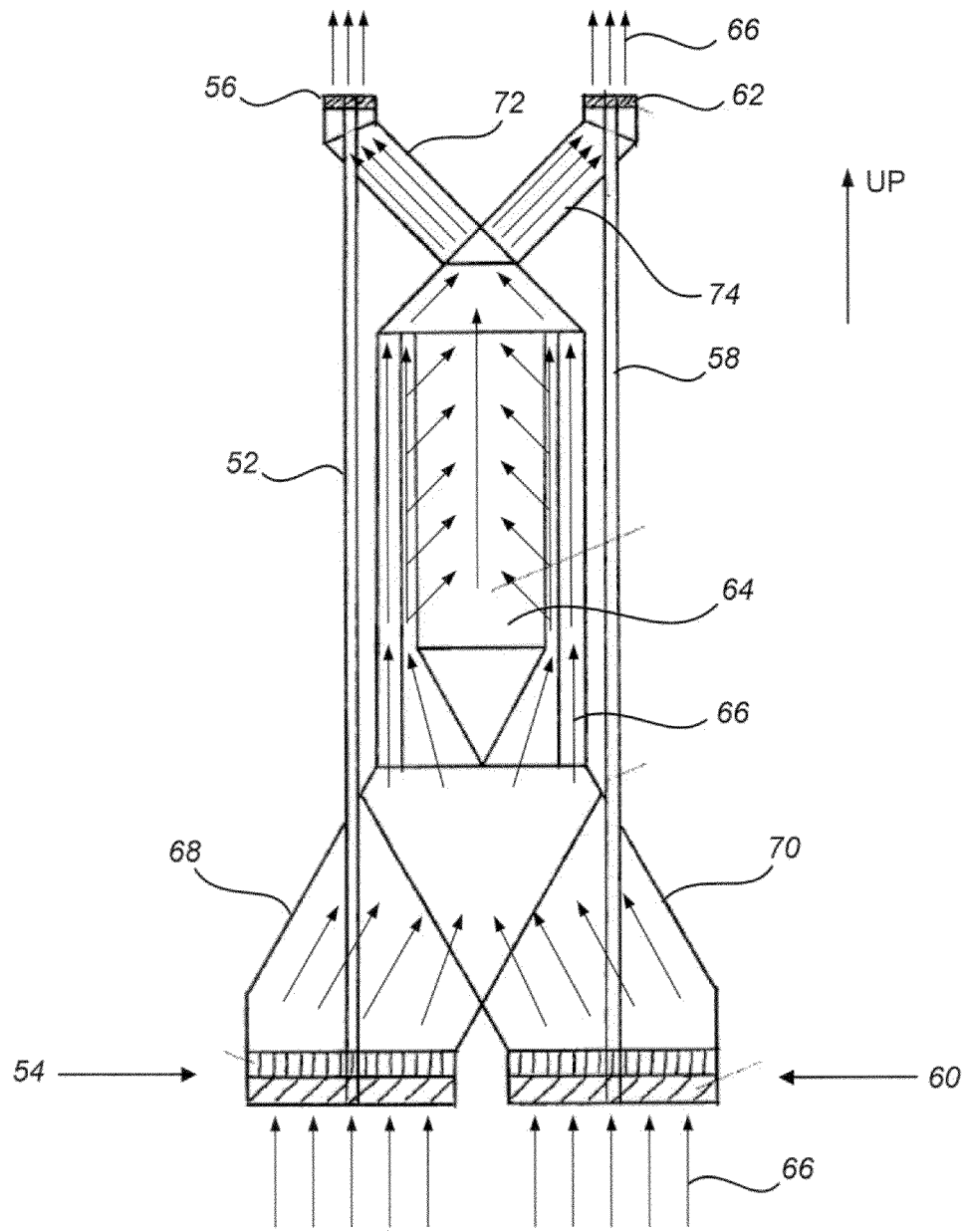
FIG. 8 is a simplified diagram of the gas turbine engine of FIG. 7, showing internal flow paths.

FIG. 8 is a simplified diagram of the thrust flow generator/gas turbine engine of FIG. 7, showing directional arrows 66 depicting the flow of air through the gas turbine engine. The first compressor 54 and the second compressor 60 supply compressed air to a central burner 64 by way of a first transfer duct 68 and a second transfer duct 70 respectively. The first compressor 54 is driven by the first rotating shaft 52, which in turn is driven by the first turbine 56. The second compressor 60 is likewise driven by the second rotating shaft 58, which is in turn driven by the second turbine 62. The compressed air is routed through and around the central burner 64 where it is heated via the burning of fuel. A variety of fuels can be used as are well know in the art, such as jet fuel. However, it may be desirable to configure the engine to use a more common fuel that is less expensive than jet fuel, such as gasoline, kerosene, diesel fuel, or the like. The heated compressed air is subsequently supplied to the first turbine 56 by way of a first turbine transfer duct 72, and is supplied to the second turbine 62 by way of a second turbine transfer duct 74. The heated compressed air drives the turbines and is discharged from the turbines as high velocity thrust flows that are transferred to the wing by way of connecting ducts (not shown) as discussed above.

FIG. 9 through FIG. 14 illustrate the use of a rotating thrust nozzle 76 to selectively redirect thrust flow. The use of a rotating thrust nozzle may provide an efficient way to selectively redirect thrust to generate vertical thrust, forward thrust, or combinations thereof.

Figure 9:
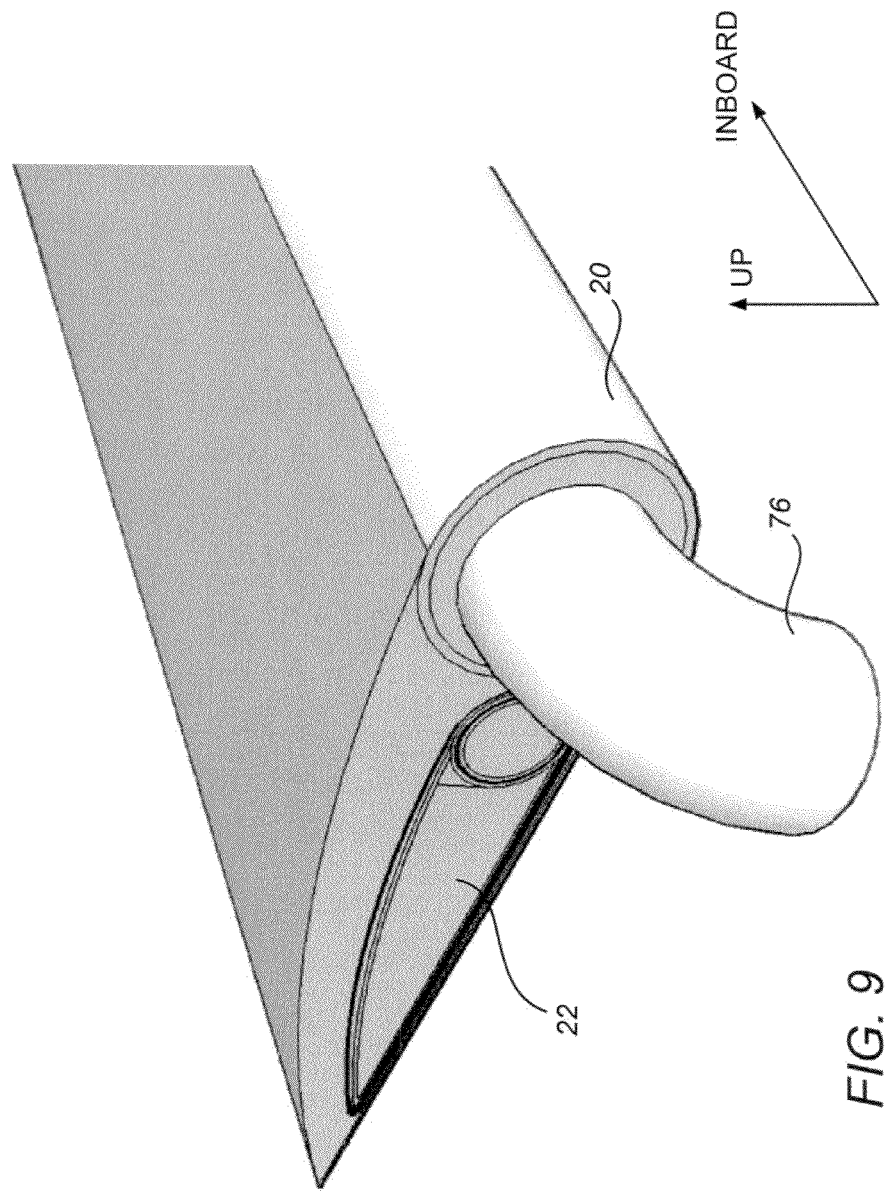
FIG. 9 is a perspective view of the end of an inboard wing section, a retracted outboard wing section, and a rotating thrust flow nozzle positioned to generate vertical thrust, in accordance with many embodiments.
Figure 10:
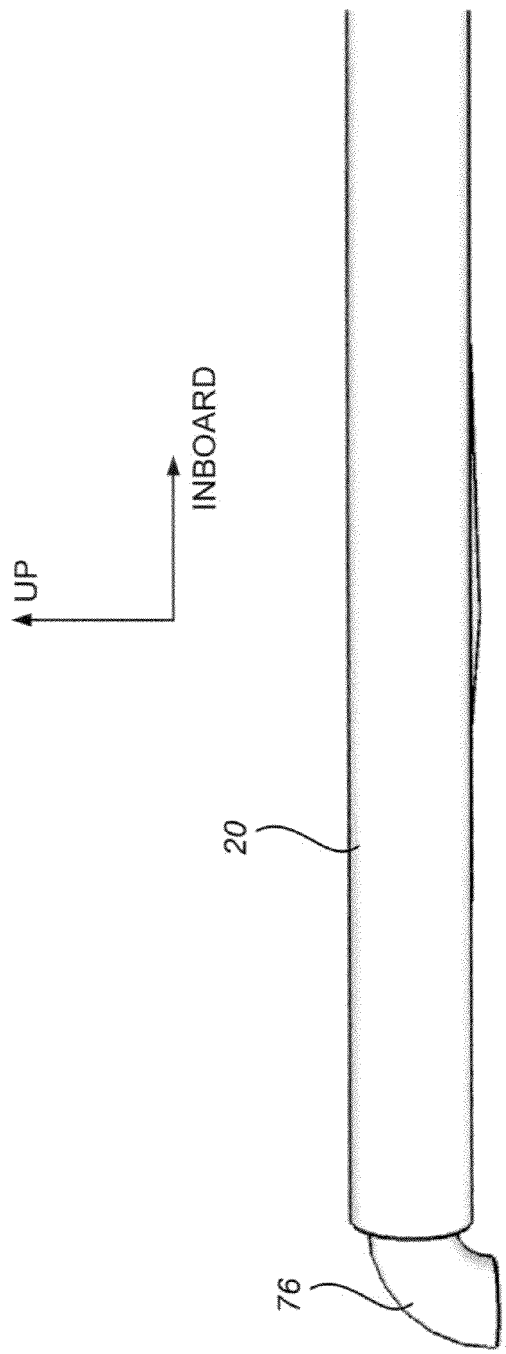
FIG. 10 is a front view of an inboard wing section and a rotating thrust flow nozzle positioned to generate vertical thrust, in accordance with many embodiments.

FIG. 9 is a perspective view of the end of an inboard wing section 20, a retracted outboard wing section 22, and a rotating thrust flow nozzle 76, in accordance with many embodiments. The rotating thrust flow nozzle 76 shown is positioned to generate vertical thrust. The configuration illustrated (outboard wing section 22 retracted and rotating thrust flow nozzle 76 positioned for vertical thrust generation) can be used during a range of flight segments requiring the generation of vertical thrust, such as during vertical takeoff and landing flight segments. FIG. 10 provides a front view of the configuration of FIG. 9.

Various flow control devices, such as the rotating thrust flow nozzle 76 shown, can also be employed as flight control devices. During vertical takeoff or landing, appropriate rotations of the rotating thrust flow nozzle 76 on each wing can be used in combination to rotate or translate the flying apparatus 10 in a variety of ways. For example, by using one or more thrust flow control devices 32 (shown in FIG. 3) to control the amount of vertical thrust generated by one wing versus the other, the flying apparatus 10 can be rolled so as to lift one wing tip in relation to the other. This roll control can be used to maneuver the flying apparatus and/or keep the flying apparatus level in the presence of wind gusts, and the like.

Figure 11:
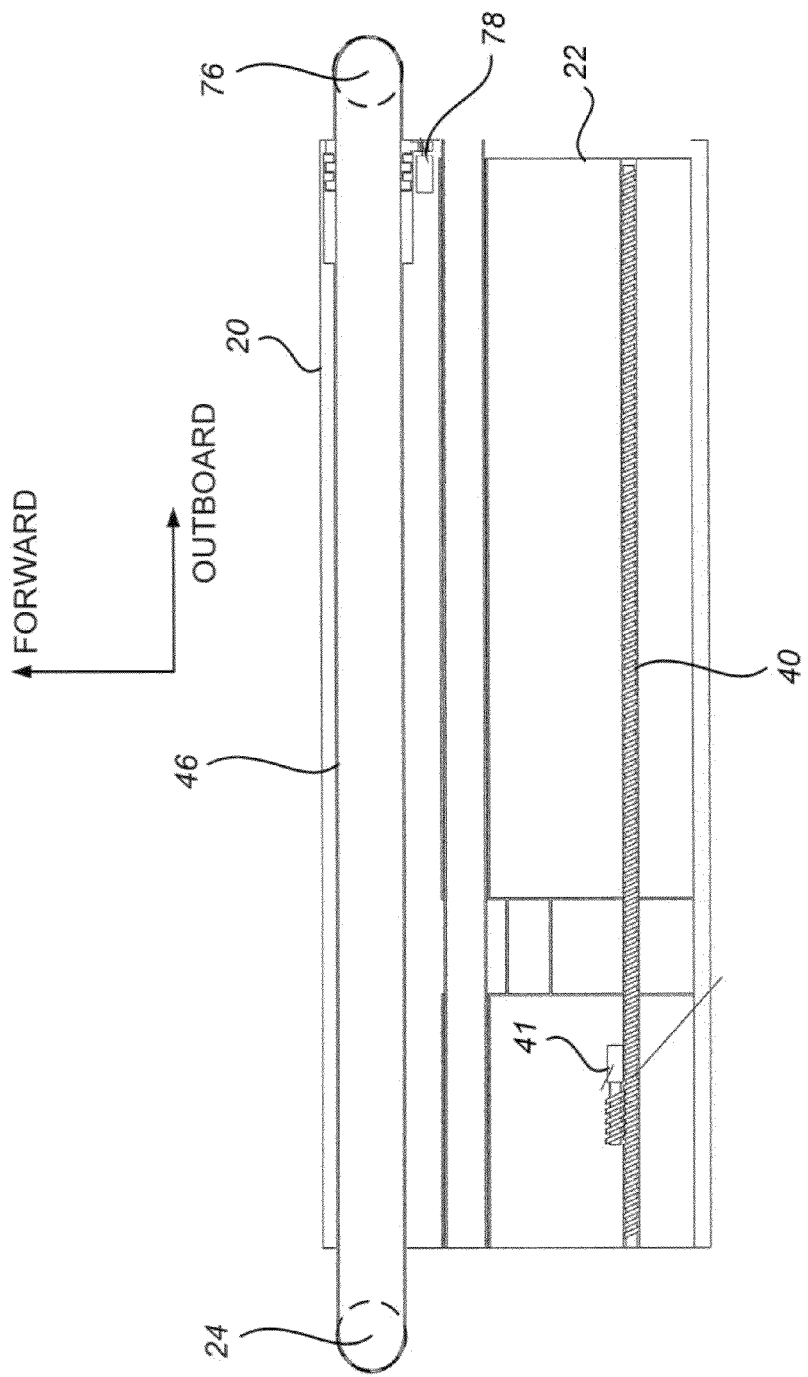
FIG. 11 is a plan view showing internal features of an inboard wing section, a retracted outboard wing section, and a rotating thrust flow nozzle positioned to generate vertical thrust, in accordance with many embodiments.

FIG. 11 is a plan view showing internal features of an inboard wing section 20, a retracted outboard wing section 22, and a rotating thrust flow nozzle 76 positioned to generate vertical thrust, in accordance with many embodiments. A transfer duct 46 is located in the forward portion of the inboard wing section 20 for routing of thrust flow from the connecting duct 24 to the rotating thrust flow nozzle 76. The position of the rotating thrust flow nozzle 76 can be controlled in a variety of ways know in the art. For example, the rotating thrust flow nozzle 76 position can be controlled using a nozzle position control motor 78. The extendible outboard wing section 22 is shown in the retracted position, but can be extended and retracted using a variety of ways, such as by a rotating screw 40 and associated motor 41.

Figure 12:
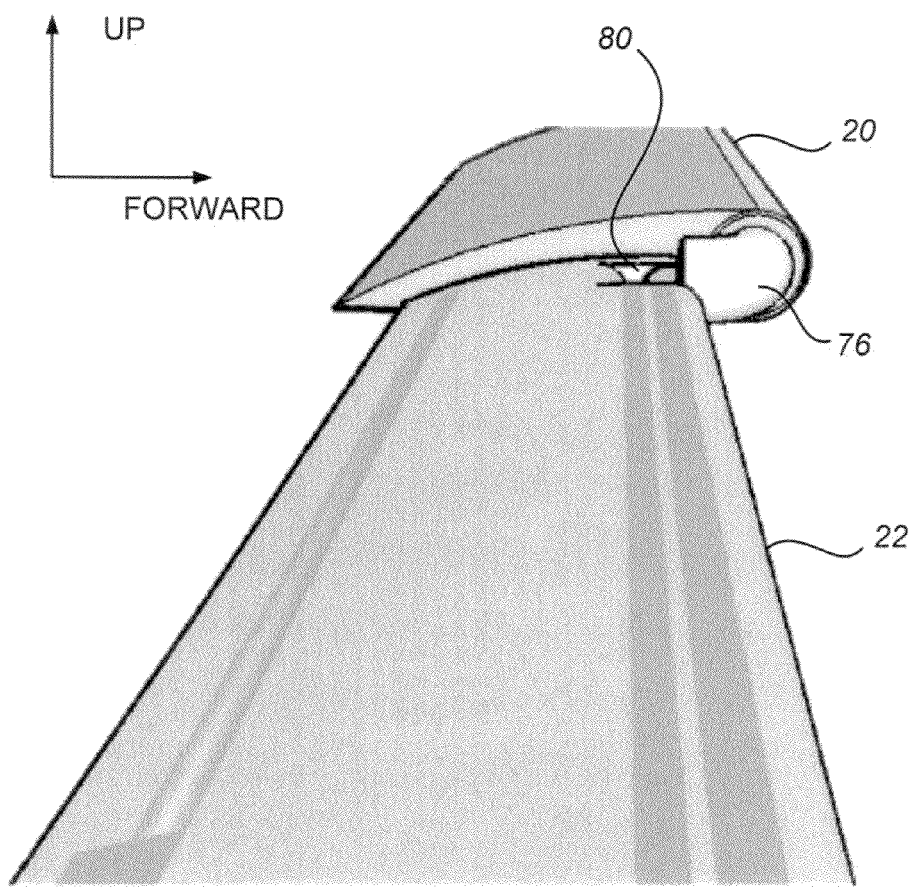
FIG. 12 is a perspective view along an extended outboard wing section and of a rotating thrust flow nozzle positioned to generate forward thrust, in accordance with many embodiments.
Figure 13:
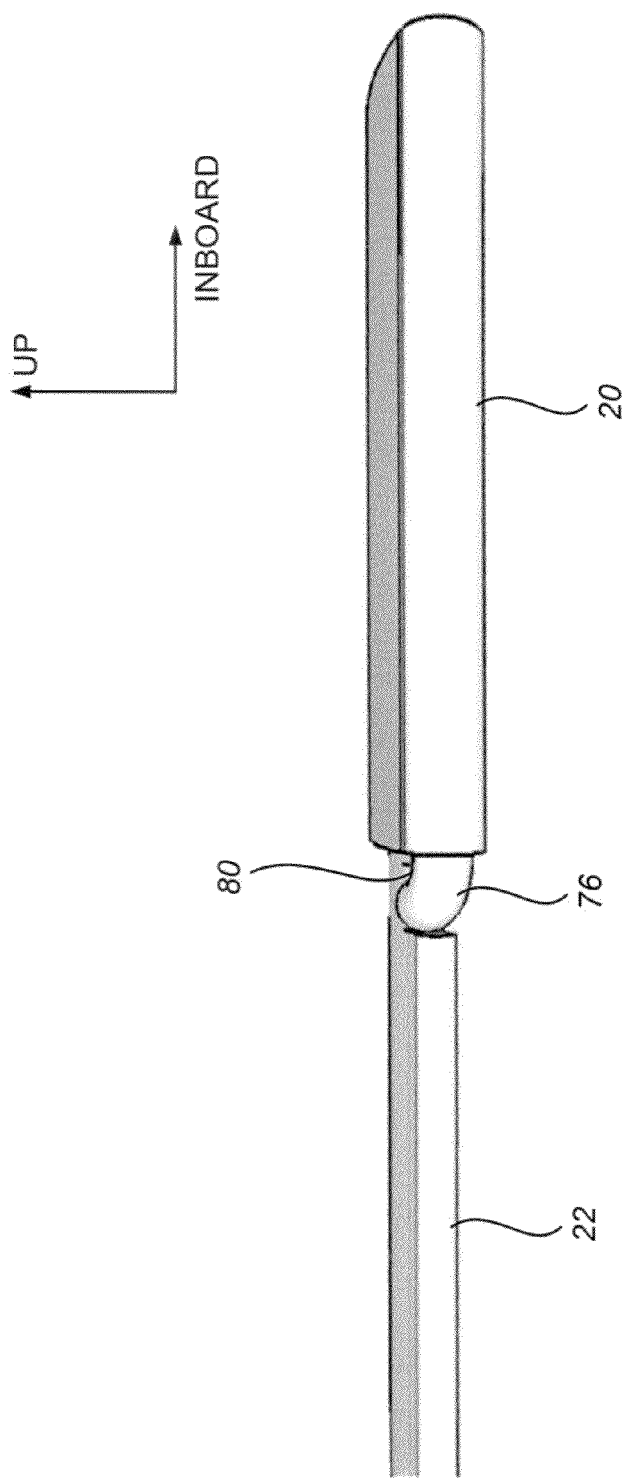
FIG. 13 is a front perspective-view of an inboard wing section, an extended outboard wing section, and a rotating thrust flow nozzle positioned to generate forward thrust, in accordance with many embodiments.

FIG. 12 is a perspective view along an extended outboard wing section 22 and of a rotating thrust flow nozzle 76 positioned to generate forward thrust, in accordance with many embodiments. The extended outboard wing section 22 includes a leading edge section 80 configured to provide clearance for rotation of the rotating thrust flow nozzle 76, as well as to provide an aerodynamic flow path for the thrust flow emerging from the rotating thrust flow nozzle 76. With the configuration shown, the transition between vertical takeoff and landing mode (where the rotating thrust flow nozzle 76 is positioned to generate vertical thrust) and forward flight mode (where the rotating thrust flow nozzle 76 is positioned as shown), can be proceeded by the extension of the outboard wing section 22. FIG. 13 provides a front perspective view of the configuration of FIG. 12.

Figure 14:
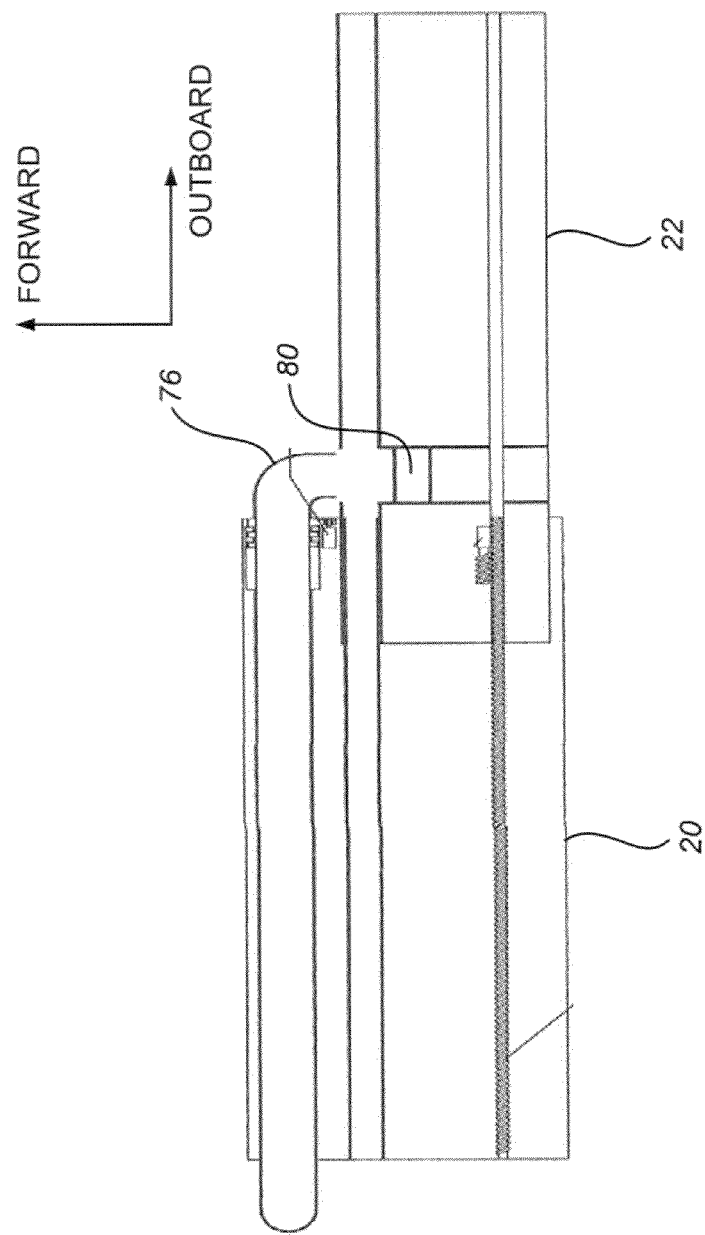
FIG. 14 is a plan-view showing internal features of an inboard wing section, an extended outboard wing section, and a rotating thrust flow nozzle positioned to generate forward thrust, in accordance with many embodiments.

FIG. 14 is a plan-view showing internal features of an inboard wing section 20, an extended outboard wing section 22, and a rotating thrust flow nozzle 76 positioned to generate forward thrust, in accordance with many embodiments. The extendible outboard wing section 22 is shown in the extended position, which places leading edge section 80 in a position just aft of the rotating thrust flow nozzle 76.

Figure 15:
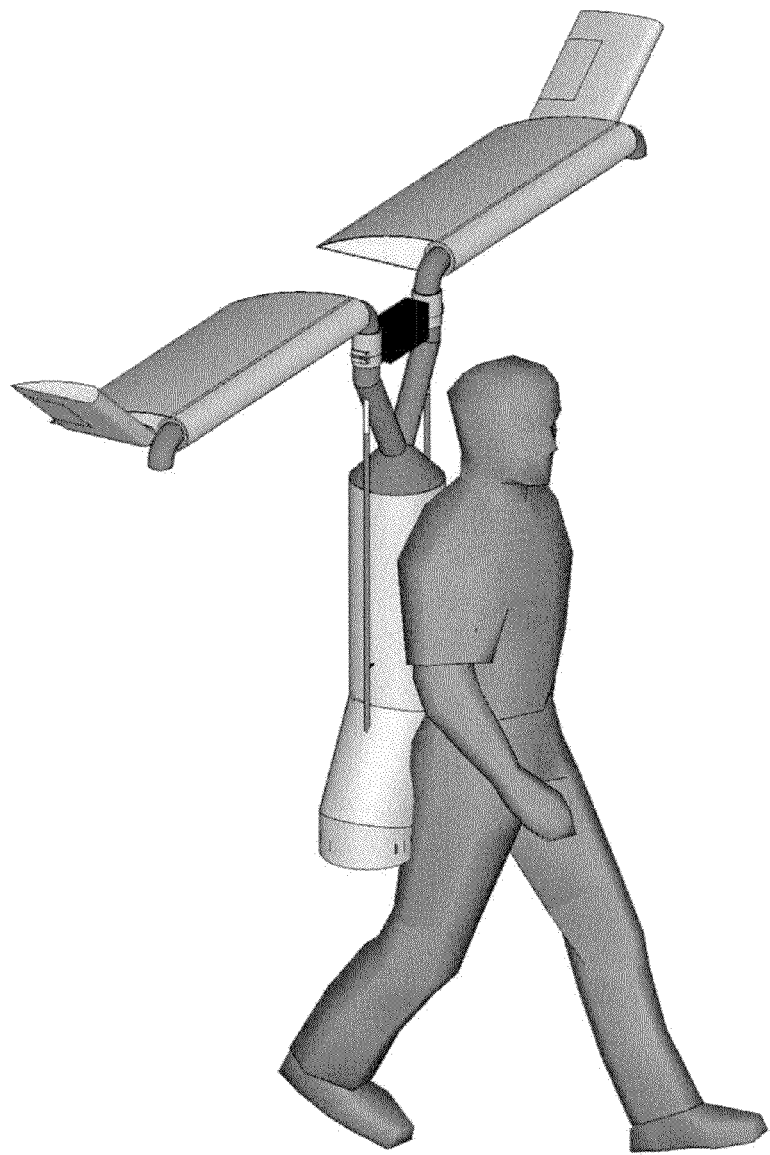
FIG. 15 is a perspective-view illustration of a personal flying apparatus in a vertical flight configuration coupled with a human operator, in accordance with many embodiments.
Figure 16A:
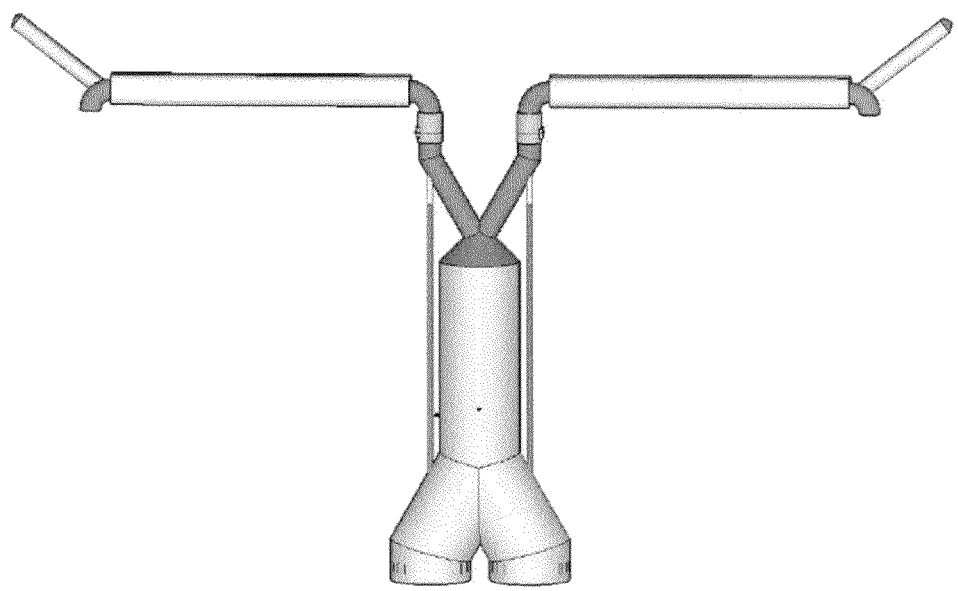
FIG. 16A is a front-view illustration of a flying apparatus in a vertical flight configuration, in accordance with many embodiments.
Figure 16B:
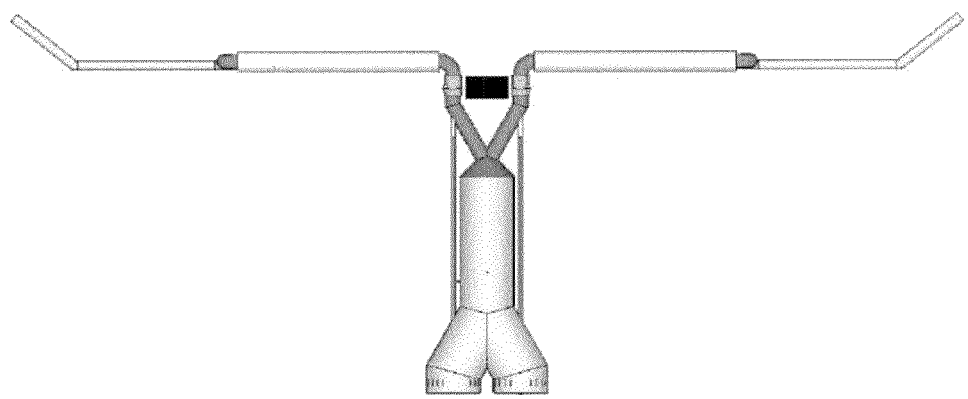
FIG. 16B is a front-view illustration of a flying apparatus in a forward flight configuration, in accordance with many embodiments.
Figure 17:
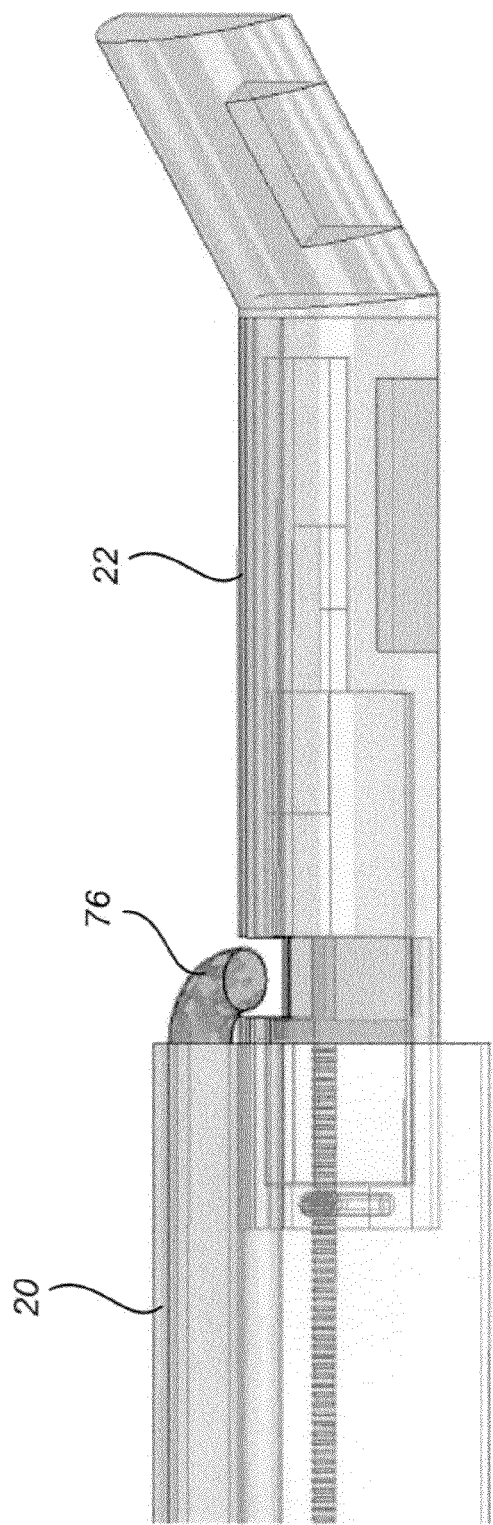
FIG. 17 illustrates an extended wing section relative to a rotating thrust nozzle positioned to generate forward thrust, in accordance with many embodiments.

FIG. 15 through FIG. 17 provide additional illustrations of a flying apparatus, in accordance with many embodiments. FIG. 15 is a perspective-view illustration of a personal flying apparatus in a vertical flight configuration coupled with a human operator. FIG. 16A is a front-view illustration of a flying apparatus in a vertical flight configuration. FIG. 16B is a front-view illustration of a flying apparatus in a forward flight configuration. FIG. 17 illustrates an extended outboard wing section 22 relative to a rotating thrust nozzle 76 positioned to generate forward thrust.

FIG. 18A is a side-view illustration of a flying apparatus having a thrust redirecting stabilizing unit 82 that can be used to control pitch, in accordance with many embodiments. The stabilizing unit 82 can redirect thrust flow so as to generate an up or down pitching moment by directing thrust flow upward or downward, respectively. The resulting force on the stabilizing unit 82, combined with the aft location of the stabilizing unit, produces a pitching moment that can be varied to provide a desired pitching moment to control and/or stabilize the flying apparatus. The stabilizer unit 82 can be supplied with a thrust flow via a duct 84. A flow of compressed air within duct 84 can be heated by an optional auxiliary burner 86 (shown in FIG. 18B) prior to the stabilizer unit. In many embodiments, the stabilizing unit 82 includes upper control louvers 88 and lower control louvers 90 as illustrated in FIG. 18C. The stabilizing unit 82 can be computer controlled, for example, to stabilize pitch.

Figures 19A, 19B:
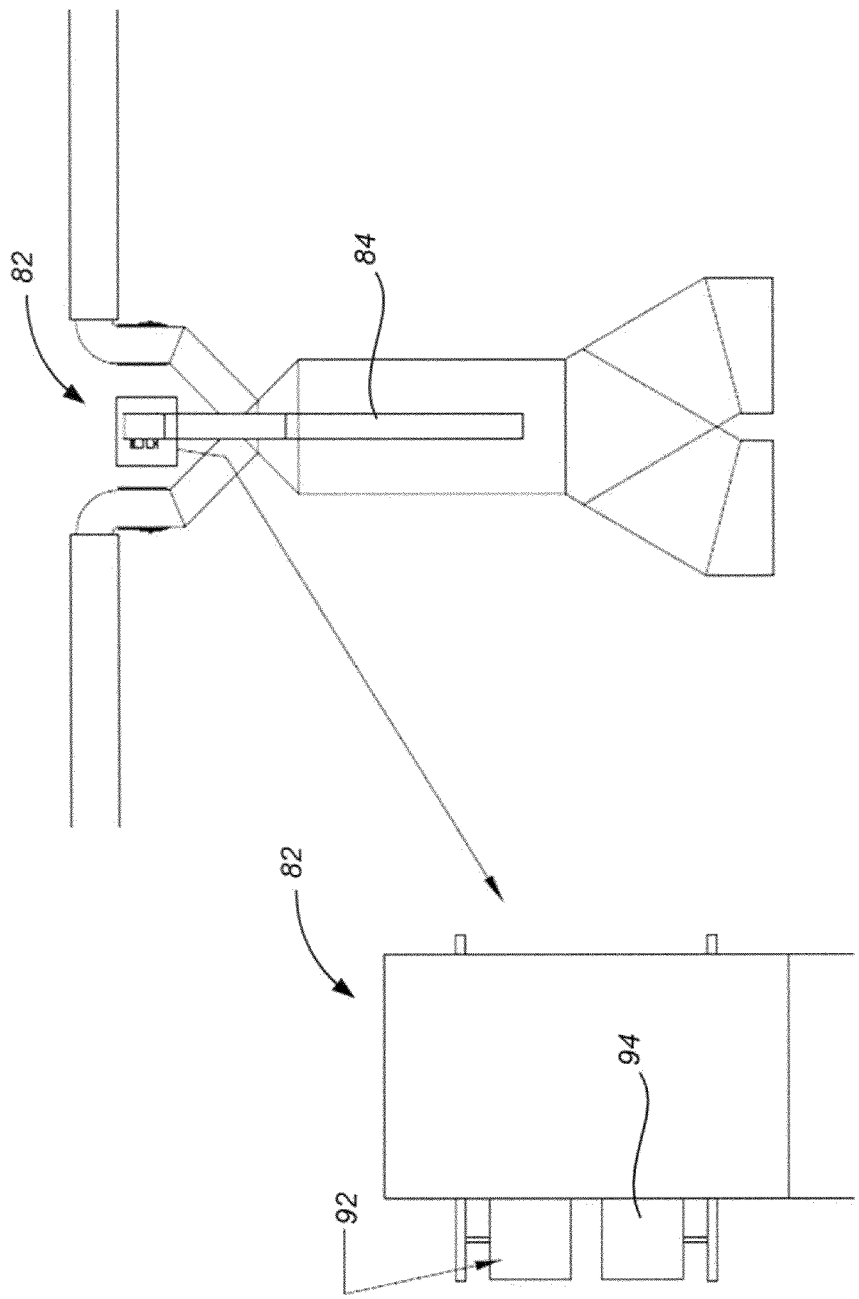
FIG. 19A is a partial rear-view illustration of a flying apparatus having a thrust redirecting stabilizing unit, in accordance with many embodiments.
FIG. 19B illustrates the location of louver control motors for the stabilizing unit of FIG. 19A.

FIG. 19A is a partial rear-view illustration of a flying apparatus having a thrust redirecting stabilizing unit 82, in accordance with many embodiments. FIG. 19B illustrates the location of control motors 92, 94 for the stabilizing unit of FIG. 19A.

Figure 20A:
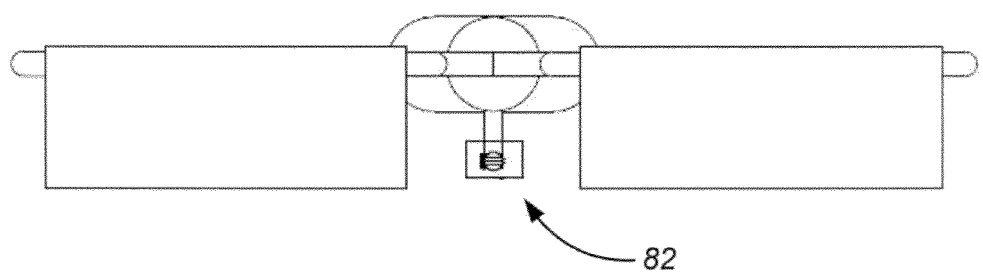
FIG. 20A is a plan-view illustration of a flying apparatus having a thrust redirecting stabilizing unit, in accordance with many embodiments.
Figure 20B:
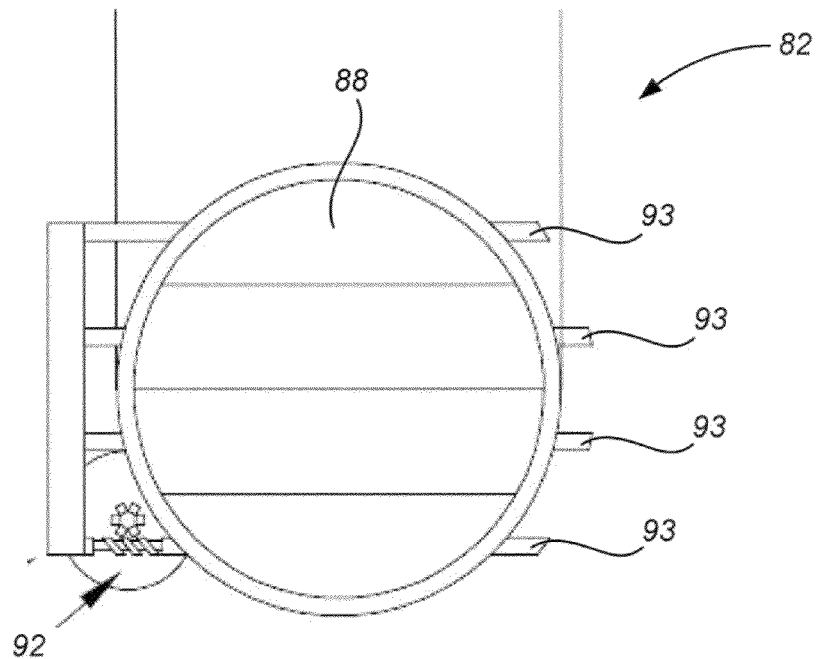
FIG. 20B is a plan-view illustrating control louvers and associated control motor for the stabilizing unit of FIG. 20A.

FIG. 20A is a plan-view illustration of a flying apparatus having a thrust redirecting stabilizing unit 82, in accordance with many embodiments. FIG. 20B is a plan-view illustrating upper control louvers 88, an associated control motor 92, and louver shafts 93, in accordance with many embodiments.

Figures 21A, 21B:
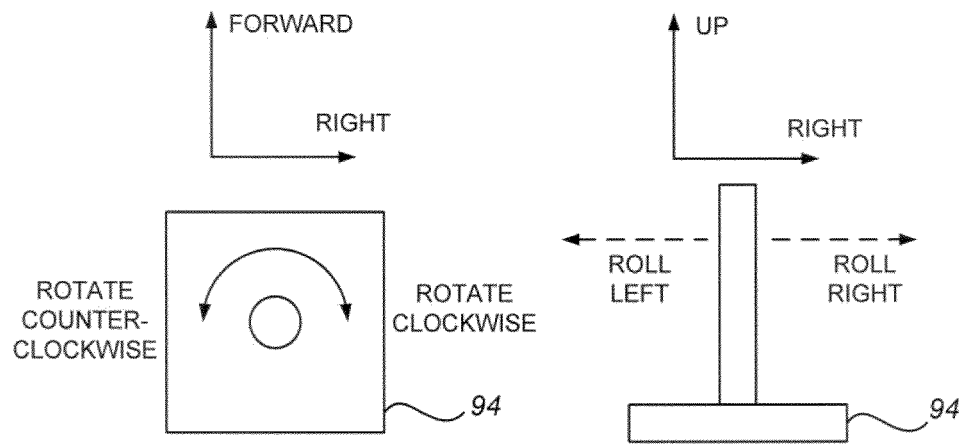
FIG. 21A is a plan view diagrammatic illustration of a flight control joy stick showing the direction of twisting control inputs that can be used to rotate a flying apparatus about its vertical axis, in accordance with many embodiments.
FIG. 21B is a rear view diagrammatic illustration of the joy stick of FIG. 21A, showing the direction of side to side tilting control inputs that can be used to roll a flying apparatus.
Figures 21C, 21D:
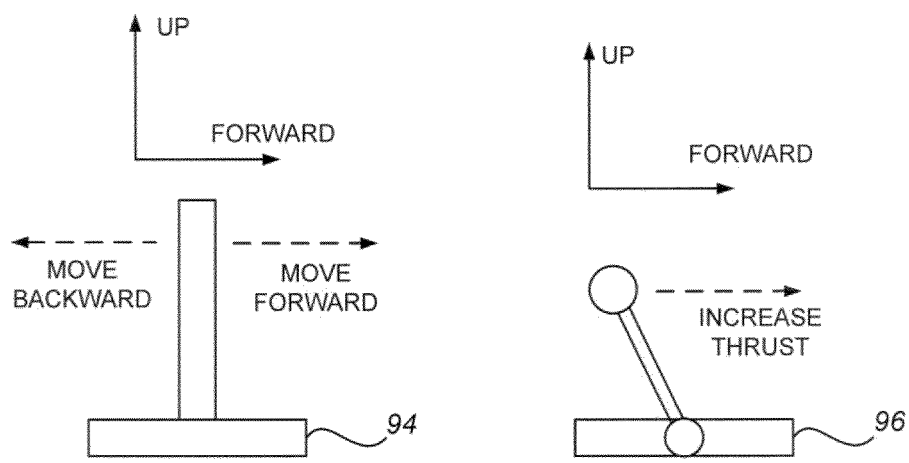
FIG. 21C is a right side view diagrammatic illustration of the joy stick of FIGS. 21A and 21B, showing the direction of fore/aft tilting control inputs that can be used to command forward and backward motion.
FIG. 21D is a right side view diagrammatic illustration of a throttle, showing a control input that can be used to increase thrust, in accordance with many embodiments.

FIGS. 21A, 21B, 21C, and 21D are simplified diagrams of flight control input devices that can be used with a flying apparatus. FIGS. 21A, 21B, and 21C show assorted views of a flight control joy stick 94. FIG. 21D shows a right side view of a thrust control throttle 96. In many embodiments, a flying apparatus is configured so that the joy stick 94 can be operated by an operator's right hand, and the throttle 96 can be operated by the operator's left hand, or vice-versa.

FIG. 21A is a plan view diagrammatic illustration of a flight control joy stick 94 showing the direction of twisting control inputs that can be used to rotate a flying apparatus about its vertical axis, in accordance with many embodiments. The control input illustrated may be advantageous due to its intuitive nature. Twisting the joy stick 94 in a counter-clockwise direction can be used to command the flying apparatus to rotate in a counter-clockwise direction about its vertical axis. This counter-clockwise rotation can be achieved by asymmetrical redirection of thrust flow so as to produce corresponding twisting moment on the flying apparatus. Once a desired angular rotation rate is achieved, the joy stick 94 can be twisted back to its neutral position. A clockwise rotation can likewise be used to command the flying apparatus to rotate in a clockwise direction. The amount of twist required to achieve a particular angular acceleration can be adjusted through modification of the control laws used. The flying apparatus can be configured to gradually reduce its angular rotation rate in response to the joy stick 94 twist being returned to its neutral position, thereby helping to avoid an over-correction feedback cycle that may occur in the absence of such dampening. Although such a twisting control input can be primarily used during hovering flight conditions, such a twisting control input can also be used during forward flight mode to assist in the coordination of any turning maneuver.

Figure 22:
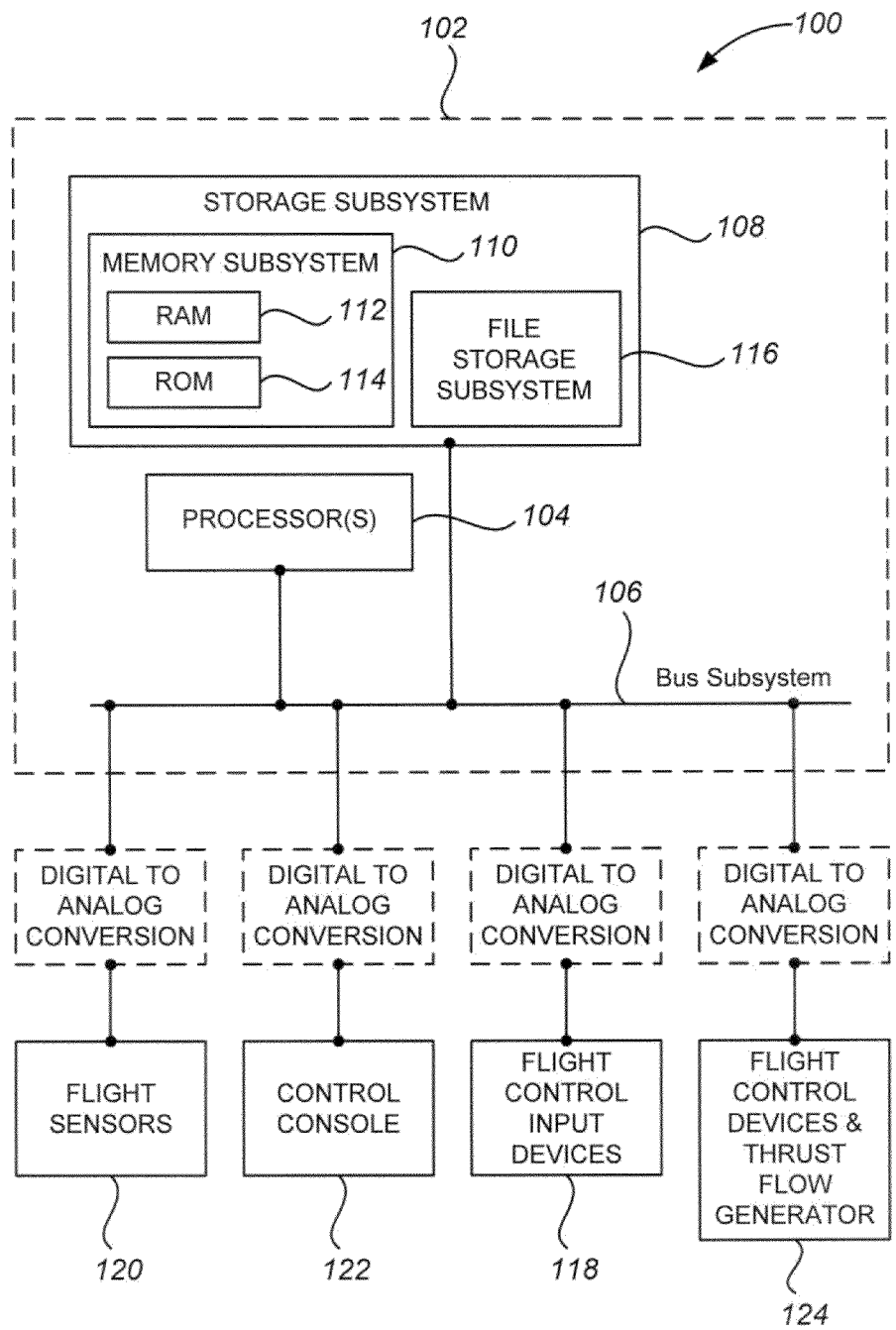
FIG. 22 is a simplified block diagram illustrating a flight control system, in accordance with many embodiments.

FIG. 21B is a rear view diagrammatic illustration of the joy stick 94 of FIG. 21A, showing the direction of side to side tilting control inputs that can be used to roll a flying apparatus. When the joy stick 94 is tilted to the right during hovering flight conditions, a flight control system (e.g., flight control system 100 as shown in FIG. 22) can command increased vertical thrust on the left wing 16 relative to the right wing 18, thereby causing the flying apparatus to roll to its right. Similarly, when the joy stick 94 is tilted to the left, the flight control system can command increased vertical thrust on the right wing 18 relative to the left wing 16. These control inputs can be useful in maintaining level wings during hovering flight conditions in the presence of wind gusts. Such roll commands can also be useful during forward flight conditions during banked turns. During forward flight conditions, the flight control system can use the above described thrust vectoring and/or flight control surfaces (e.g., the ailerons 38—shown FIG. 2) to produce the desired roll rate. These roll command inputs can be made to be intuitive and/or match traditional roll command inputs used in existing aircraft. These roll commands can also be automatically supplemented by the flight control system so as to provide quick response to wind gusts and the like. Automatic supplementation of roll thrust differentials can be accomplished in a way so as to provide dampened motions.

FIG. 21C is a right side view diagram of the flight control joy stick 94 showing a forward and aft tilting input command that can be used during hovering flight conditions to command forward and backward motion. When the joy stick 94 is tilted forward, the flight control system can command the generation of forward thrust, thereby causing the flying apparatus to move forward. Likewise, when the joy stick 94 is tilted backward, the flight control system can command the generation of backward thrust, thereby causing the flying apparatus to move backward.

It should be appreciated that the flight control system can be configured in a variety of ways so as to provide a smooth transition between hovering flight conditions and forward flight conditions. For example, the flight control system can be configured to automatically reconfigure thrust flow redirection in response to forward airspeed. As the forward airspeed of the flying apparatus builds, the wings will progressively generate more lift. As the lift on the wing builds, the thrust flow redirection control devices can be commanded to gradually reconfigure to a position appropriate for the current airspeed. As airspeed builds, wing control surfaces (e.g., the ailerons 38 discussed above) can be used to provide increased levels of roll and pitch control. This same sequence can be repeated in the reverse direction. For example, as airspeed and wing lift drops, the thrust flow redirection control devices can be commanded to provide an appropriate increase in vertical thrust.

The flight control system can be configured to provide for manual and/or automatic extension of the outboard wing sections. Automatic-extension of the outboard wing sections can be provided in a variety of circumstances. If the operator has not already manually commanded extension of the outboard wing sections, the flight control system can be configured to automatically extend the outboard wing sections in any number of circumstances. For example, the flight control system can be configured to provide automatic extension when the forward airspeed exceeds a threshold value. As a further example, the flight control system can be configured to provide automatic extension when the flight control joy stick 94 is moved forward past a hovering flight condition maneuvering limit.

The flight control system can be configured to activate wing control surfaces (e.g., the ailerons 38) for use during certain flight conditions. For example, the wing control surfaces can be activated once the extendible outboard wing section is extended, or can be activated above a certain forward airspeed. Once activated, the wing control surfaces can be controlled by the joy stick 94 so as to allow the operator to control roll and pitch of the flying apparatus during forward flight conditions in the same manner as with a standard fixed wing aircraft. The roll and pitch control provided by the wing control surfaces can be supplemented using the above described thrust vectoring. The position of the wing control surfaces and the positions of the thrust nozzles can be selected based upon the particular control inputs and the flight condition parameters involved. For example, the positions of the wing control surfaces and thrust nozzles can be based upon joy stick position, throttle position, airspeed, altitude, attitude, and the like.

FIG. 21D is a right side view diagram of the exemplary throttle 96 showing a forward and aft tilting input command that can be used to command the level of thrust flow desired. During takeoff, the throttle 96 can be advanced to command a level of vertical thrust sufficient to overcome the weight of the apparatus and human operator. During landing, the throttle 96 can be used in a likewise fashion. A variety of throttle controls can be used, such as a twist mechanism, a foot actuated mechanism, and the like.

Control of rate of climb during hovering flight conditions can be accomplished using a combination of the command position of the throttle 96 and the forward/aft tilt position of the joystick 94. For example, if an increased rate of climb is desired at any particular forward/aft tilt position of the joystick 94, the throttle 96 can be advanced. Likewise, if a decrease in the rate of climb is desired at any particular forward/aft tilt position of the joystick 94, the throttle 96 can be retarded.

The flight control system can provide for the ability to use the forward/aft tilt position of the joystick 94 for the control of pitch during forward flight conditions. The flight control system can be configured to provide for a smooth transition in the way the forward/aft tilt position of the joystick 94 is used between hovering and forward flight conditions. For example, as forward airspeed builds, the flight control system can increasingly use the forward/aft tilt position of the joystick 94 exclusively for pitch control. In such a manner, the positions of both the joystick 94 and the throttle 96, as well as flight condition parameters such as airspeed, altitude, attitude, and the like, can be used by the flight control system to determine the position of the flight controls and thrust flow redirection control devices so as to produce the desired change in rate of climb. The angle of attack of the wing can also be brought into play by corresponding inputs to the wing flight control surfaces (e.g., the ailerons 38 shown in FIG. 2).

FIG. 22 is a simplified block diagram illustrating a flight control system 100, in accordance with many embodiments. The flight control system 100 includes a flight controls electronic unit 102 (FCEU). The FCEU 102 includes at least one processor 104 which communicates with a number of peripheral devices via a bus subsystem 106. These peripheral devices typically include a storage subsystem 108.

The storage subsystem 108 maintains the basic programming and data constructs that provide the functionality of the FCEU 102. Software modules for implementing the flight control responses discussed above are typically stored in the storage subsystem 108. Storage subsystem 108 typically includes a memory subsystem 110 and a file storage subsystem 116.

The memory subsystem 110 typically includes a number of memories including a main random access memory (RAM) 112 for storage of instructions and data during program execution and a read only memory (ROM) 114, in which fixed instructions are stored.

The file storage subsystem 116 provides persistent (non-volatile) storage for program and data files, and can include a hard drive, a disk drive, or other non-volatile memory such as a flash memory. An input device, for example a disk drive, can be used to input the software modules discussed above. Alternatively, any other means well know in the art may be used to input the software modules, for example, a USB port.

In this context, the term "bus subsystem" is used generically so as to include any mechanism for letting the various components and subsystems communicate with each other as intended. The bus subsystem 106 is shown schematically as a single bus, but a typical system has a number of buses such as a local bus and one or more expansion buses (e.g., ADB, SCSI, ISA, EISA, MCA, NuBus, or PCI), as well as serial and parallel ports.

The FCEU 102 controls the flight control devices 124 in response to assorted received signals. Flight sensors 120 provide flight parameter signals, such as airspeed, altitude, thrust level, fuel quantity, warning signals, and the like. A control console 122 can provide additional control signals as appropriate, such as ignition, starting, and the like. Flight control input devices 118, such as discussed above, provide additional control signals to the FCEU 102. The FCEU 102 processes the assorted received signals, and outputs control signals that are used to control the various components of a flying apparatus, for example, the flight control devices and the thrust flow generator 124. These flight control device control signals can be further processed as appropriate, such as by converting the signal from digital to analog.

While the exemplary embodiments of the present invention have been described in some detail by way of example and for clarity of understanding, a variety of modifications, changes, and adaptations will be obvious to those with skill in the art. Hence, the scope of the invention is limited solely by the appended claims.

What is claimed is:

1. A flying apparatus comprising:
    a thrust flow generator; and
    a wing coupled with the thrust flow generator, the wing including a left wing portion and a right wing portion, each wing portion including an extendible wing section and an extension mechanism for extending the extendible wing section, each of the left wing portion and the right wing portion further including a rotating nozzle for selective redirection of at least a portion of a thrust flow, the wing being adapted to receive the thrust flow from the thrust flow generator and selectively redirect the thrust flow in a first direction and in a second direction, wherein when the thrust flow is redirected in the first direction vertical thrust is predominantly generated, and wherein when the thrust flow is redirected in the second direction forward thrust is predominantly generated.

2. The apparatus of claim 1, further comprising a mount configured to couple the flying apparatus with a human operator so as to lift the operator, wherein the left and right wing sections comprise a first folding wing section disposed on a first side of the thrust flow generator and a second folding wing section disposed on a second side of the thrust flow generator, the second side being opposite the first side, each of the first and second folding wing sections having a folded non-flight position and a deployed flight position.

3. The apparatus of claim 2, wherein each of the first and second folding wing sections is movable between its folded non-flight position and its deployed flight position by way of rotary motion about an axis of rotation.

4. The apparatus of claim 2, wherein the first and second folding wing sections are adapted to couple with each other when in their deployed flight positions so as to provide a continuous airfoil.

5. The apparatus of claim 1, wherein each of the extension mechanisms comprises a motor driven screw.

6. The apparatus of claim 1, wherein each of the extendible wing sections comprises an aerodynamic control surface.

7. The apparatus of claim 1, wherein each of the extendible wing sections comprises a leading edge section adapted to accommodate a rotation of one of the rotating nozzles.

8. The apparatus of claim 1, wherein the thrust flow generator comprises a gas turbine engine.

9. The apparatus of claim 1, further comprising a thrust redirecting stabilizing unit to control pitch.

10. A personal flying apparatus comprising:
- a mount adapted to couple the personal flying apparatus with a human operator;
- a gas turbine engine coupled with the mount, the gas turbine engine including a first rotating shaft and a second rotating shaft, the first rotating shaft coupling a first compressor with a first turbine, and the second rotating shaft coupling a second compressor with a second turbine, the gas turbine engine further including a common burner for adding thermal energy to a combined flow of air, the combined flow of air including output from both the first and second compressors; and
- a wing coupled with the gas turbine engine, the wing including a first span and an oppositely disposed second span, the wing being adapted to:
  - receive a first thrust flow from the gas turbine engine, route the first thrust flow along the first span, and selectively redirect the first thrust flow in a first direction and in a second direction, wherein when the first thrust flow is redirected in the first direction vertical thrust is predominantly generated, and when the first thrust flow is redirected in the second direction forward thrust is predominantly generated; and
  - receive a second thrust flow from the gas turbine engine, route the second thrust flow along the second span, and selectively redirect the second thrust flow in a third direction and in a fourth direction, wherein when the second thrust flow is redirected in the third direction vertical thrust is predominantly generated, and when the second thrust flow is redirected in the fourth direction forward thrust is predominantly generated.

11. The apparatus of claim 10, wherein the first thrust flow is received from the first turbine and the second thrust flow is received from the second turbine.

12. The apparatus of claim 10, further comprising a flight configuration and a non-flight configuration, the flight configuration having each of the first and second spans in a deployed flight position, and the non-flight configuration having each of the first and second spans in a folded non-flight position.

13. The apparatus of claim 12, wherein the first and second spans are adapted to couple with each other when in their deployed flight positions so as to provide a continuous airfoil.

14. The apparatus of claim 10, wherein each of the first and second spans comprises an extendible wing section.

15. The apparatus of claim 10, further comprising a thrust redirecting stabilizing unit to control pitch.

* * * * *